United States Patent
Wang et al.

(10) Patent No.: US 11,567,183 B2
(45) Date of Patent: Jan. 31, 2023

(54) RADAR DETECTION OF MOVING OBJECT WITH WAVEFORM SEPARATION RESIDUAL

(71) Applicant: Mitsubishi Electric Research Laboratories, Inc., Cambridge, MA (US)

(72) Inventors: Pu Wang, Cambridge, MA (US); Petros Boufounos, Winchester, MA (US); Hassan Mansour, Boston, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 181 days.

(21) Appl. No.: 16/843,213

(22) Filed: Apr. 8, 2020

(65) Prior Publication Data

US 2021/0318424 A1    Oct. 14, 2021

(51) Int. Cl.
*G01S 13/58*    (2006.01)
*G01S 7/28*    (2006.01)
(Continued)

(52) U.S. Cl.
CPC ............ *G01S 13/582* (2013.01); *G01S 7/288* (2013.01); *G01S 7/292* (2013.01); *G01S 7/41* (2013.01);
(Continued)

(58) Field of Classification Search
CPC ........ G01S 13/582; G01S 7/288; G01S 7/292; G01S 7/41; G01S 13/505; G01S 13/56; G01S 7/2883; G01S 13/584; G01S 13/931; G01S 7/023; G01S 2013/93271; G01S 2013/93272; G01S 7/356; G01S 7/0234; G01S 13/325; G01S 13/878; G01S 13/87; G01S 7/352; G01S 13/42; G01S 13/003; G01S 7/4021; G01S 13/284; G01S 7/415;
(Continued)

(56) References Cited

U.S. PATENT DOCUMENTS 10,725,175 B2 *   7/2020   Sahin ................. G01S 15/8979
2012/0127027 A1 * 5/2012   Sahinoglu ........... G01S 13/5244
                                                                   342/189

OTHER PUBLICATIONS

Feng, R., Uysal, F., Aubry, P., & Yarovoy, A. (2018). MIMO-Monopulse Target Localization for Automotive Radar. IET Radar, Sonar and Navigation, 12(10), 1131-1136. https://doi.org/10.1049/iet-rsn.2018.5013 (Year: 2018).*

(Continued)

*Primary Examiner* — Erin F Heard
*Assistant Examiner* — Juliana Cross
(74) *Attorney, Agent, or Firm* — Gennadiy Vinokur; Hironori Tsukamoto

(57) ABSTRACT

A multiple input multiple output (MIMO) radar system for detecting a moving object is based on an explicit signal model. The explicit signal model accounts for waveform separation residuals by relating measurements of the virtual array to an auto-term including a Kronecker product of object-receiver signatures and transmitter-object signatures; and a cross-term including a Kronecker product of object-receiver signatures and transmitter-object residual signatures. The radar system uses a spatial MIMO object detector that is based on the explicit signal model to detect the moving object.

13 Claims, 20 Drawing Sheets

(51) Int. Cl.
  *G01S 7/41*    (2006.01)
  *G01S 13/50*   (2006.01)
  *G01S 13/56*   (2006.01)
  *G01S 7/292*   (2006.01)
  *G01S 7/288*   (2006.01)
(52) U.S. Cl.
  CPC ............ *G01S 13/505* (2013.01); *G01S 13/56* (2013.01); *G01S 7/2883* (2021.05)
(58) Field of Classification Search
  CPC . G01S 13/5244; G01S 13/106; H04B 7/0413; H04B 1/1027; H04J 13/12; H04J 13/10; H04J 13/16
  See application file for complete search history.

(56) References Cited

OTHER PUBLICATIONS

Skaria et al. "Interference Mitigation in Automotive Radars Using Pseudo-Random Cyclic Orthogonal Sequences." Sensors (Basel). Oct. 2019; 19(20): 4459. Published online Oct. 15, 2019. doi: 10.3390/s19204459.

Ustalli., "Detection and motion parameters estimation techniques in Forward Scatter Radar." A thesis submitted in partial fulfillment of the requirements for the degree of Doctor of Philosophy in Information and Communications Technologies Curriculum in Radar and Remote sensing. Sapienza University of Rome, Feb. 2018.

Rogers et al. "MIMO Radar Waveform Design and Sparse Reconstruction for Extended Target Detection in Clutter ." Old Dominion University ODU Digital Commons. Electrical & Computer Engineering Theses & Disssertations. Spring 2019.

* cited by examiner

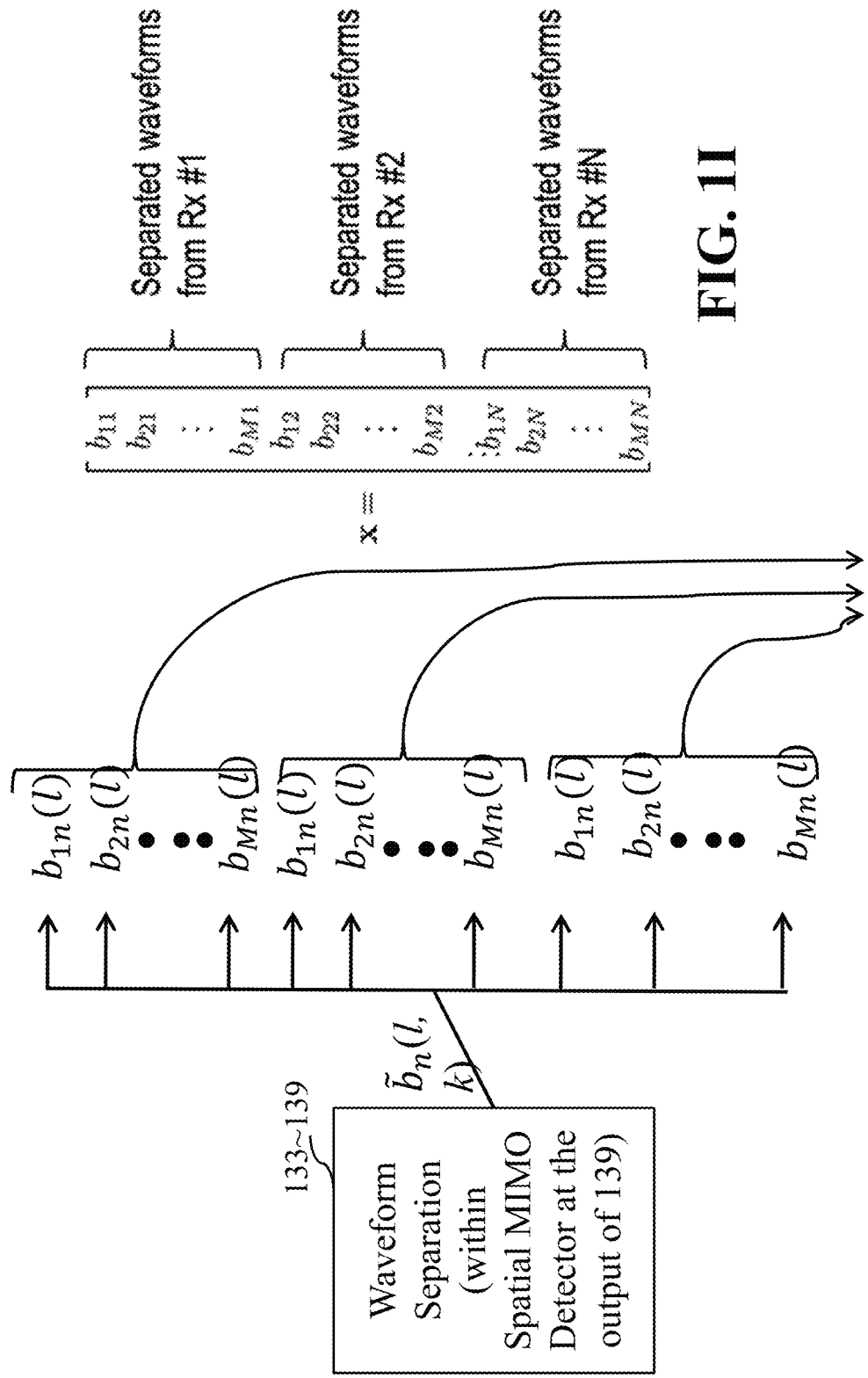

RADAR DETECTION OF MOVING OBJECT WITH WAVEFORM SEPARATION RESIDUAL

TECHNICAL FIELD

This invention generally relates to a radar system used for detecting a moving object, and more specifically to the radar system that takes into account waveform separation residuals to detect the moving object.

BACKGROUND

Automotive radar has manifested its role from existing advanced driver assistance systems (ADAS) to emerging autonomous driving. Along with ultrasonic, camera, and Light Detection and Ranging (LIDAR) sensors, it assists the task of environmental sensing and understanding in all-weather conditions with affordable costs and scalable production. Particularly, automotive radar provides direct measurements of radial velocities, long operating ranges, small sizes at millimeter or sub-terahertz frequency bands, and high spatial resolutions.

Among relatively new signaling schemes for better capability of handing mutual interferences, e.g., phase-modulated continuous wave (PMCW) and stepped-carrier orthogonal frequency division multiplexing (OFDM), frequency modulated continuous waveform (FMCW) is overwhelmingly used in the industry for its simple transceiver architecture and low requirements on sampling rate to harness the benefit of wide frequency bandwidth. At the same time, to increase the spatial resolution, waveform-coded multiple-input multiple-output (MIMO) radars have been incorporated into the automotive radars for expanded virtual array aperture. The virtual array comprises unique pairwise combinations of transmitters and receivers. In general, MIMO radars can be realized in either the time domain by using time-division multiple accesses (TDMA) or the waveform domain. The MIMO radars may be implemented in an automobile and may be used to detect one or more moving objects with respect to the automobile. In highly dynamical environments such as highways, the waveform-coded MIMO is preferred. Compared with fast-time MIMO radars that require multiplying orthogonal codes on the sample-to-sample basis, slow-time MIMO radars that require multiplying orthogonal codes only on the pulse-to-pulse basis appears to be a more cost-efficient solution for hardware implementation.

Currently, in the MIMO radars, it is assumed that each receiver of the MIMO radars achieves a perfect waveform separation by applying corresponding orthogonal codes that are used at the transmitters to transmit signals. Each of the perfectly separated waveform reflection corresponding to a transmitted signal is assumed to be free of waveform residuals that occur due to interference from waveform reflections corresponding to other transmitted signals from other transmitters. It is difficult to obtain such ideal waveform separation across all Doppler frequencies and time delays. Therefore, assuming the perfect waveform separation at the receiver in order to detect the one or more moving objects may affect efficiency of the MIMO radars to detect object.

Accordingly, there is a need of a radar system that accounts for the waveform separation residuals to enhance the efficiency of the radar system to detect the one or more moving objects.

SUMMARY

The automotive radar systems are used in for example, but not limited to automobiles to detect one or more moving objects in an environment such as highway, roads, traffic signals, and the likes around the automobile. The moving objects may be vehicles, pedestrians, or the likes in vicinity of the automobile. Recently, due to the capability of achieving higher spatial resolution with a smaller amount of antenna elements, the MIMO radars are incorporated into the automotive radar systems. In highly dynamical environments such as highways, the waveform-coded MIMO is preferred.

An automotive radar system in the proposed disclosure incorporates the MIMO radar. Thus, the MIMO radar system comprises a set of transmitters and a set of receivers. Each transmitter of the set of transmitter transmits a reference signal such as chirp signal towards a target. The radar system may comprise a signal generator that generates the reference signal for the set of transmitters. Further, the target may be the one or more moving objects or stationary objects. In order to detect the one or more moving objects correctly, the reference signals from different transmitters of the set of transmitters should not interfere with each other. To that end, the MIMO radar system, in the proposed disclosure, encodes each reference signal with orthogonal codes (e.g. Hadamard code). The proposed MIMO radar system may comprise an orthogonal code generator that generates the orthogonal codes to encode each reference signal transmitted by each transmitter of the set of transmitters. Therefore, when two transmitted signals encoded with orthogonal codes interfere, they produce a null, ideally, and thus minimization of the interference can be achieved. Thus, the MIMO radar system transmits several coded pulses, where each coded pulse is orthogonal to the other. The orthogonal codes are also used at receivers for waveform separation.

Further, the MIMO radar system, in the proposed disclosure, uses a set of receivers to receive echoes or reflections of the transmitted signals (i.e. the coded pulses/reference signals). The transmitted signals may be reflected from the one or more objects, where the one or more objects may be moving or stationary. Each receiver of the multiple receivers receives a signal that is a superposition of reflections of the multiple reference signals transmitted by the multiple transmitters i.e., each receiver receives a combined signal, where each signal of the combined signal corresponds to reflections of all the transmitted signals. In order to detect the one or more moving objects, it is important for the radar system to separate each waveform of reflection of the transmitted signal from the combined signal that is superposition of all reflected transmitted signals.

Some embodiments are based on the realization that the radar system can utilize the orthogonal codes that are used at the transmitter to achieve the waveform separation at the receiver side. To that end, each receiver is configured to multiply the received combined signal with the corresponding orthogonal code (i.e. the chirp signal) used by the transmitter corresponding to that receiver. Due to the property of orthogonality of the codes, multiplication of two different codes will result in a zero value ideally, whereas multiplication with the same code results in a non-zero value.

Using this property of orthogonality, each receiver can separate reflection waveform corresponding to the reference signal transmitted by each of the M transmitters, from the combined signal. However, a perfect waveform separation is unlikely across all Doppler frequencies and time delays, i.e. some waveform separation residuals are still left in the separated reflection waveform. These waveform separation residuals are associated with the reflections of other transmitted signals. If the waveform residuals are not taken into account for detecting the object, the accuracy of the MIMO radar system to detect the one or more moving objects may be affected.

To that end, the MIMO radar system, in the proposed disclosure, uses an explicit signal model that accounts for imperfect waveform separation effect. In particular, the explicit signal model accounts for the waveform separation residuals in order to detect the one or more moving objects. Some embodiments are based on the realization that the consideration of the waveform separation residuals increases the accuracy of the MIMO radar system to detect the one or more moving objects. The explicit signal model accounts for the waveform separation residuals by relating measurements of the virtual array to an auto-term including a Kronecker product of object-receiver signatures and transmitter-object signatures, and a cross-term including a Kronecker product of object-receiver signatures and a combination of residual transmitter-object signatures.

The proposed MIMO radar system implements the explicit signal model by using a baseband range-Doppler object detector and a spatial MIMO detector. The baseband range-Doppler object detector determines the number of detected objects based on the echo signal, and further estimates ranges and velocities corresponding to the detected one or more objects. In some implementation, to achieve this objective, the baseband range-Doppler object detector performs two one-dimensional (1D) Fourier transforms along the slow-time and fast-time domains on the digitally sampled baseband beat signal. By performing two 1D FFTs the range-Doppler object detector calculates a threshold to be used for detecting presence of the one or more objects. Further, in some embodiments, the baseband range-Doppler object detector includes a continuous false alarm rate circuitry that compares energy of the received signal with the threshold to detect whether a true object is present or not.

Some embodiments are based on the realization that determination of spatial location of the moving object requires to compensate the baseband signal with accurate Doppler shifts for detected objects from the range-Doppler object detection module. The Doppler shift is the change in frequency of a wave in relation to an observer (radar system or targets) who is moving relative to the wave source. Doppler shift is change in frequencies of sound waves that are emitted by an object when the object is moving towards an observer. The observer can notice change in frequencies of the sound waves as the object moves away from the observer or moves towards the observer. For example, when a train or truck approaches, the observer (human), a certain frequency sound can be heard. As the high speed train or truck passes, the sound immediately drops several octaves. This is caused by a frequency shift caused by the Doppler effect. The Doppler effect can also be applied to motion relative to a radar system and a target object.

For example, if the radar is mounted on a vehicle or vehicle based radar, then the Doppler frequency shifts is due to the relative motion between the vehicle based radar and target object. For example, if a target is travelling on a highway at 70 mph and an approaching vehicle-based radar is traveling at 50 mph, the radar will show a Doppler shift corresponding to 120 mph. The radar will need to subtract the speed of the radar (50 mph in this example) to obtain speed of the target. This can be of great advantage in a radar system. By binning the receive echoes both over range and Doppler frequency, target speed as well as range can be determined. Also, this allows easy discrimination between moving objects, such as an aircraft, and the background clutter, which is generally stationary.

For example, consider a radar operating at a frequency (f) 70 GHz, then the wavelength ($\lambda$) of the radar can be calculated as: $\lambda=c/f$, where c is velocity of light. Therefore, $\lambda=0.0043$ m or 4.3 mm. When the vehicle based radar is travelling at 50 mph, is tracking a target ahead moving at 100 mph in the same direction. In this case, the speed differential is −50 mph, or −22.35 m/s.

Therefore, the proposed MIMO radar system uses the spatial MIMO detector that compensates the ranges and the velocities of the detected one or more objects for the Doppler shift. When the baseband signal compensated with these detected Doppler values at discretized Doppler grids, there are Doppler mismatches between the true Doppler frequency and the detected Doppler frequency. Such Doppler mismatch can be large or small depending on the Doppler grid stepsize in the range-Doppler object detection module. The existence of Doppler mismatch means that the baseband signal has additional modulations on the pulse-to-pulse basis. As one can recall that the orthogonal code is also implemented on the pulse-to-pulse basis, the consequence of Doppler mismatch is, if one multiply the orthogonal code from one transmitter element, there will be waveform residuals contributed from other transmitter elements due to the additional modulation from the Doppler mismatch.

The spatial MIMO detector then performs separation of waveforms associated with each transmitter-receiver pair of the virtual array in the presence of unknown Doppler mismatch.

Some embodiments are based on the realization that, in order to determine angle of the object i.e. azimuthal angle/elevation angle of the object, the radar system should consider echoes of all the reference signals together, which forms a Kronecker subspace. To that end, the proposed radar MIMO system comprise a spatial MIMO detector that forms a signal vector of size MN which comprises M separated waveforms from each of the N receivers. The signal vector is then used to determine spatial location of the object.

Under perfect waveform separation, i.e., no Doppler mismatch, the above signal vector contains a possible object signature vector and noise vector. However, due to the Doppler mismatch, some embodiments are based on the realization that the signal vector also contains a possible residual signature (residuals) if the object is present.

The spatial MIMO detector stacks the separated waveform of all the unique transmitter-receiver pair into the received signal vector. Due to the way of stacking M separated waveforms from each of the N receivers, an object signature (the auto-term) is a Kronecker product between the transmitter-object signature and the object-receiver signature.

In some embodiments, the residual signature (cross-term) is found to be a Kronecker product between the transmitter-object residual signature and the object-receiver signature. The object signature and residual signature shares the same object-receiver signature but different transmitter-object signatures.

In some embodiments, the transmitter-object signature is a function of a relative angle between each transmitter of the set of transmitters and the object, wavelength of transmitted signal, and a relative distance between the two consecutive transmitter elements of the set of transmitters. Similarly, the object-receiver signature is a function of a relative angle between each receiver of the set of receivers and the object, wavelength of received signal, and a relative distance between the two consecutive receiver elements of the set of receivers.

Additionally, or alternatively, some embodiments further realize that the transmitter-object residual signature for one transmitter element is a weighted sum of transmitter-object signatures from all other transmitter elements, where the weights are given by the so-called code residual. The code residual between two transmitter elements is the weighted sum of product of orthogonal codes used at the two transmitter elements, weighted by an exponential function with the Doppler mismatch as the argument.

In the case of perfect waveform separation, i.e., the Doppler mismatch is zero, the code residual is zero since the sum of the product of orthogonal codes is zero. If the code residual is zero, the transmitter-object residual signature for one transmitter element is also zero. As a result, signal vector only contains the object signature and noise. The residual signature is zero as, e.g., in slow-time MIMO-FMCW radar schemes.

However, due to the discovered nature of Doppler mismatches in detecting moving object, at least some residual signatures are not zero and need to be considered. For velocity estimation, the sampling of received echo signals is "slow"—one per pulse. Because of the slow sampling and due to limited number of pulses, the velocity estimation is quantized. Due to this quantization defining resolution of velocity estimation, the estimated velocity may differ from actual velocity. Let's say the resolution of the velocity estimation is 5 km/hr. If the actual relative velocity of the moving object is 39 km/hr, the estimated velocity would be 40 km/hr. This difference is velocity mismatch, which is equivalent to Doppler mismatch in frequency domain.

Some embodiments further realize that quantization defines a Maximum Doppler mismatch. If the maximum Doppler mismatch is known, the transmitter-object residual signature can approximated as the sum of weighted transmitter-object signature from only a few number of pre-selected transmitter elements (instead of the original all-other transmitter elements). This leads to a subspace-based transmitter-object residual signature. Together with the object-receiver signature, the overall residual signature is now a Kronecker subspace signal.

Additionally, or alternatively, some embodiments are based on the realization that the spatial MIMO detector can be implemented using a generalized likelihood ratio test (GLRT). The GLRT algorithm formulates the object detection as a binary hypothesis testing problem, where the waveform residuals or residual signature only appear in the alternative hypothesis when the target of interest i.e. the object is present. The GLRT algorithm may be used to determine presence of the object in the spatial domain. To that end, the GLRT algorithm determines a GLRT statistics based on hypothesis, and compares the GLRT statistics with a predetermined threshold. Based on the detected one or more objects at a particular spatial location, the MIMO radar system further determines other parameters associated with the detected one or more objects.

In some embodiments, the parameters comprise at least one of radial velocity, a spatial angle, and a distance to the object a memory configured to store an explicit signal model that accounts for waveform separation residuals by relating measurements of the virtual array to an auto-term including a Kronecker product of object-receiver signatures and transmitter-object signatures, and a cross-term including a Kronecker product of object-receiver signatures and a combination of residual transmitter-object signatures; a processor configured to detect a moving object by executing a spatial MIMO detector configured to detect the moving object using the explicit signal model; and an output interface configured to output parameters associated with the detected object.

Accordingly, one embodiment discloses, a multiple input multiple output (MIMO) radar system for detecting a moving object, the system comprising: a set of transmitters and a set of receivers forming a virtual array of unique pairwise combinations of the transmitters and the receivers to measure reflections of transmissions. The MIMO radar system include a memory configured to store an explicit signal model that accounts for waveform separation residuals by relating measurements of the virtual array to an auto-term including a Kronecker product of object-receiver signatures and transmitter-object signatures, and a cross-term including a Kronecker product of object-receiver signatures and a combination of residual transmitter-object signatures and a processor configured to detect a moving object by executing a spatial MIMO detector configured to detect the moving object using the explicit signal model. An output interface of the MIMO radar system is configured to output parameters associated with the detected object.

In some embodiments, the processor is configured to execute a baseband range-Doppler object detector configured to detect one or multiple more moving objects, estimate a range and a velocity of each of the detected moving objects, and, for each detected moving object, extract a portion of the measurements of the virtual array corresponding to the range of the moving object, compensate the extracted measurements for the velocity (or, equivalently, the Doppler shift) of the moving object, and feed the extracted and compensated measurements to the spatial MIMO detector to determine one or combination of the angle (e.g., azimuth and elevation) of the moving object.

In some embodiments, each transmitter is configured to transmit a set of frequency modulated pulses to illuminate a scene and to form the measurements, wherein the baseband range-Doppler object detector is configured to determine the range of the moving object using a fast-time fast Fourier transform (FFT) that samples each transmitted pulse multiple times for range compression, and wherein the baseband range-Doppler object detector is configured to determine the velocity of the moving object using slow-time FFT that samples each transmitted pulse once for Doppler compression.

In some embodiments, a number of pulses or the size of the set of frequency modulated pulses defines a resolution of velocity estimation causing a Doppler mismatch between an actual velocity of the moving object and the velocity estimated by the baseband detector using the slow-time FFT, and wherein the frequency modulated pulses of different transmitters are encoded on pulse-by-pulse basis with orthogonal codes and decoded with corresponding orthogonal codes for each transmitter-receiver pair of the virtual array, wherein the auto-term of the explicit signal model captures decoded transmission of the transmitter-receiver pair, and wherein the cross-term of the explicit signal model captures residuals of different transmissions in the decoded transmission of the transmitter-receiver pair caused by the Doppler mismatch.

In some embodiments, for each transmitter-receiver pair of the virtual array, the combination of residual transmitter-object signatures of the cross-term includes residual transmitter-object signatures of all transmitters with an exception of the transmitter of the transmitter-receiver pair, wherein a value of a residual transmitter-object signature of a particular transmitter is a function of a Doppler mismatch between an actual velocity of the moving object and the velocity estimated by the baseband detector, and wherein the value of a residual transmitter-object signature of a particular transmitter is set to zero when a maximum value of the residual transmitter-object signature of the particular transmitter determined for a maximum Doppler mismatch is less than a threshold.

In some embodiments, the combination of transmitter-object residual signatures is approximated as a weighted sub-combination of a predetermined maximum Doppler mismatch. In some example embodiments, the parameters comprise at least one of radial velocity, a spatial angle, and a distance to the detected object, In some embodiments, the transmitter-object signature is a function of a relative angle between each transmitter of the set of transmitters and the detected object, wavelength of transmitted signal, and a relative distance between the two consecutive transmitter elements of the set of transmitters; and the object-receiver signature is a function of a relative angle between each receiver of the set of receivers and the detected object, wavelength of received signal, and a relative distance between the two consecutive receiver elements of the set of receivers.

In an example embodiment, the spatial MIMO detector is implemented using a generalized likelihood ratio test (GLRT) algorithm, wherein the GLRT algorithm determines a GLRT statistic to detect the moving objects. Further, the GLRT algorithm formulates and tests a first hypothesis and a second hypothesis, wherein the first hypothesis is that the reflections of transmission comprises only noise, and the second hypothesis is that the reflections of transmission comprises reflected signals from the moving objects, the waveform separation residuals, along with the noise.

In an example embodiment, the GLRT algorithm determines: a first distribution under the first hypothesis, and a second distribution under the second hypothesis, wherein the first distribution is a central F distribution, and wherein the second distribution is a non-central F distribution.

In an example embodiment, the processor is further configured to: compare the GLRT statistic with a predetermined threshold, wherein the predetermined threshold is based on the number of transmitters and receivers, wherein when the GLRT statistic is greater than the predetermined threshold, the second hypothesis is true, and wherein when the GLRT statistic is less than the predetermined threshold, the first hypothesis is true.

BRIEF DESCRIPTION OF THE DRAWINGS

FIG. 1H illustrates the waveform separation within a spatial MIMO detector, in accordance with some embodiments.

FIG. 1I shows an exemplary signal vector containing separated waveforms of each transmitter-receiver pair, according to an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

In general Radio Detection and Ranging (RADAR) systems are used to determine presence of a target, and different parameters associated with the target. The target can be one or more objects which are either stationary or moving with respect to the RADARs. The different parameters associated with the target may be distance of the object from the RADAR, velocity of the object with respect to the RADAR, angle of the object (e.g. azimuthal/elevation angles), where the angle of the object can be used by the RADAR to determine location of the object in spatial domain or direction in which the object is moving with respect to the RADAR, or the likes. Some embodiments are based on the realization that in order to determine the angle of the object accurately, the RADAR system requires multiple transmitters and multiple receivers. To that end, the present disclosure proposes a multiple input multiple output (MIMO) radar system that comprises an array of transmitters and an array of receivers. The waveform-coded MIMO RADAR with orthogonal codes applied to the pulse-to-pulse basis is explained in detail with reference to FIG. 1A. More specifically, each pulse is a frequency modulated continuous wave (FMCW) and the same pulse is used by all transmitters and repeated multiple times over time to form a train of pulses.

Figure 1A:
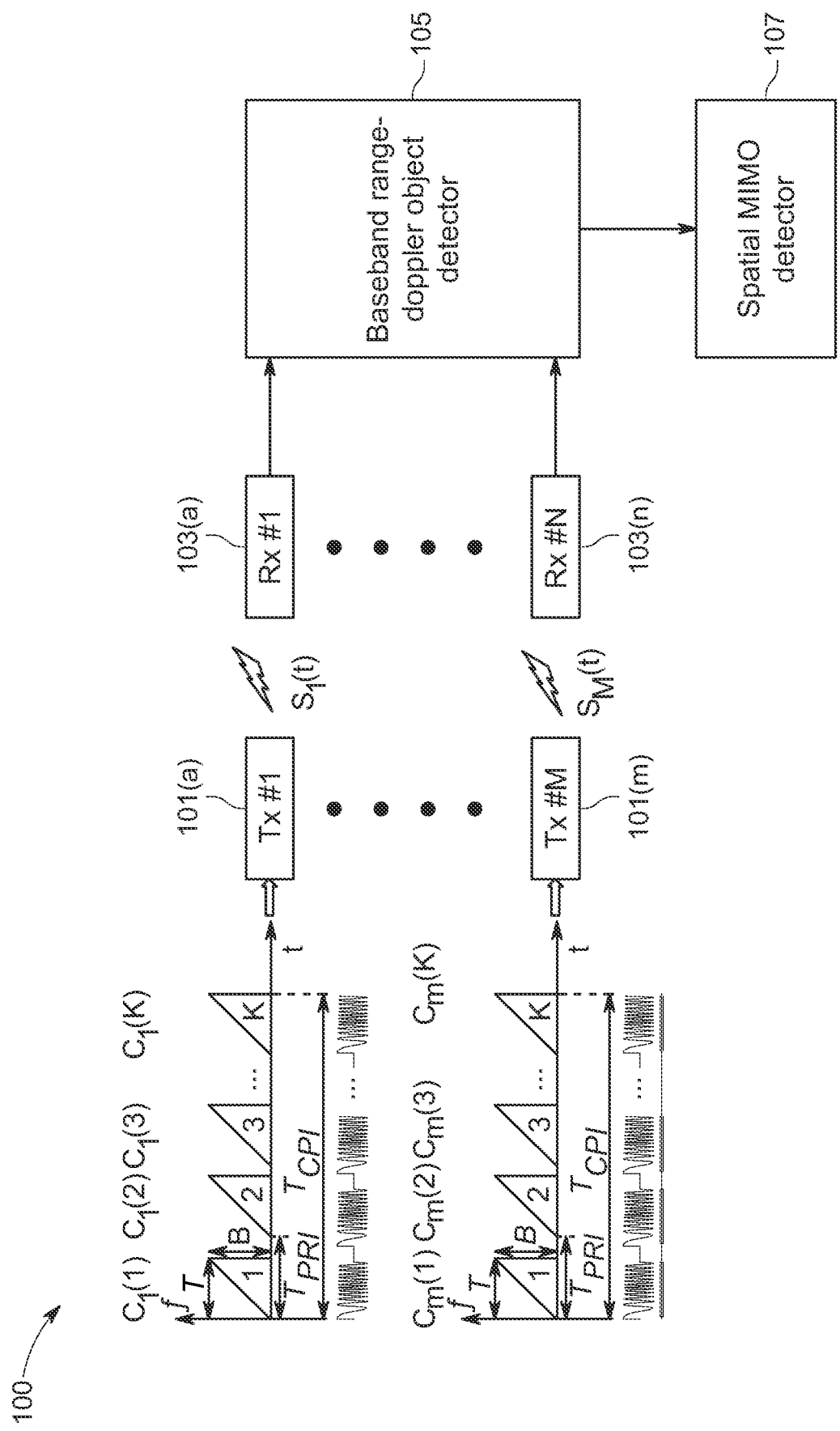
FIG. 1A illustrates a slow-time MIMO FMCW automotive radar system architecture for detection of a moving object, in accordance with some embodiments.

FIG. 1A illustrates a slow-time MIMO-FMCW automotive radar system architecture for detection of a moving object, in accordance with some embodiments. As can be observed from the FIG. 1A, the system 100 comprises a set of M transmitters 101(a)-101(m) and a set of N receivers 103(a)-103(n). As mentioned above, each transmitter sends a train of coded waveform pulses and the same pulse is repeated over time, K times for K pulses. Each pulse is a frequency modulated continuous wave (FMCW).

The multiple transmitters and the multiple receivers extend dimensions of the RADAR to create a virtual array, where the virtual array comprises unique combinations of the pairs of transmitter and receivers (for example, Tx #1 and Rx #1, Tx #2 and Rx #1, and the likes) to measure reflections of transmissions. Further, the MIMO automotive radar system 100 comprises a memory (not shown in the figure) configured to store an explicit signal model that accounts for waveform separation residuals by relating measurements of the virtual array to an auto-term including a Kronecker product of object-receiver signatures and transmitter-object signatures, and a cross-term including a Kronecker product of object-receiver signatures and a combination of residual transmitter-object signatures. The radar system 100 further comprises a processor configured to detect a moving object by executing a spatial MIMO detector configured to detect the moving object using the explicit signal model. The radar system 100 further comprises an output interface configured to output parameters associated with the detected object.

The slow-time MIMO-FMCW automotive radar system uses a frequency modulated continuous wave signaling scheme. To that end, the proposed radar system comprises a signal generator (not shown in the figure) that generates a radar signal or frequency modulated pulses that are provided to each transmitter of the M transmitters. Each pulse comprises multiple frequencies increasing over time to create a signal sweep as illustrated in the FIG. 1A (specifying in the figure). Further, each transmitter is configured to transmit a set of frequency modulated pulses to illuminate a scene and to form the measurements. The pulses are transmitted in all the directions. In an example embodiment, the pulses generated by the signal generator may be a chirp signal that is to be transmitted as the radar signal for object detection. As the transmitted signal is constantly varying in frequency, the echo has a slightly different frequency compared to the signal being transmitted at that moment. The difference between these frequencies is directly proportional to the echo delay (i.e. the distance from the transmitter to the object), which enables the level to be accurately measured. Further, the N receivers 103(a)-103(n) are configured to receive the reflected echo signals or reflections of the transmissions. An advantage of FMCW signaling scheme is that the object information can be efficiently saved in the beat signal by multiplying the reflected signal with the source FMCW pulse with a low analog-to-digital (ADC) sampling rate.

Some embodiments are based on the recognition that reflections corresponding to all the reference signals transmitted by the M transmitters that are received at each receiver of the N receivers are to be considered together to determine the angle of the object, where the angle of the object may be used to determine spatial location of the object. However, the transmissions corresponding to all the M transmitters may interfere with each other. To address this issue, the proposed radar system is configured to use a coding scheme (for example, an orthogonal coding scheme) to minimize the interference, where the frequency modulated pulses of different transmitters are encoded on pulse-by-pulse basis with orthogonal codes and decoded with corresponding orthogonal codes for each transmitter-receiver pair of the virtual array. According to the coding scheme, the pulses transmitted by each transmitter are multiplied with K codes c(1) to c(K). As can be observed in the figure, the FMCW pulses transmitted by the transmitter #1 which when coded with K codes can be represented as $c_1(1)$ to $c_1(K)$, similarly for M-th transmitter the coded FMCW pulses are represented as $c_M(1)$ to $c_M(K)$.

Further, these pulses are reflected from the target, where the reflected pulses are also referred to as echo signals. The receivers are configured to receive these echo signals. On reception of the echo signal, each receiver may use this coding scheme to decode the received signal and to obtain a signal corresponding to each unique pairwise transmission. After decoding, the receiver may determine parameters such as spatial location of the stationary objects (for example, trees, street lights, or the likes) accurately angle of a stationary object (for example, trees, street lights, or the likes) accurately.

The current radar systems are configured to compensate for the Doppler shift before decoding the echo signal in order to determine the spatial angles associated with the detected target. This method of compensations is referred to as preprocessing from hereon. Thus, in the preprocessing, the received signal or the echo signal is first processed in a Doppler domain (or a frequency domain) to compensate the received signal for the Doppler shift. The compensated signal is later decoded to estimate parameters of the object. Because of the compensation, the moving object appears stationary with respect to the radar, which allows for ideal separation of the unique pairwise transmission at each receiver, and consequently allows the radar system to determine spatial angles of the detected object. The spatial angles may comprise transmitting angle, receiving angles, and elevations of the object in spatial domain, or the likes. In this way, the unique pairwise transmissions are separated and the each separated signal is processed in the spatial domain.

Some embodiments are based on the recognition that such ideal separation of waveform, associated with each unique pairwise combination, from the entire received signal is not possible, because even after compensation each separated waveform comprises residues or residual waveforms from other transmitters. For example, a waveform separated for a pair Tx #1-Rx #1, comprises residues from other transmitters, such as from Tx #2, Tx #3, . . . , Tx #M. The current radar systems use a signal model which is based on ideal separation of waveforms i.e. the current signal model does not consider the residuals. Therefore, such radar system may affect the object detection in the spatial domain such as angle of the object.

To address this issue, the present disclosure proposes the MIMO automotive radar system that is based on the explicit signal model that takes into account the residuals for calculation of the parameters of the detected one or more objects. To that end, the proposed MIMO radar system comprises a baseband range-Doppler detector 105 and a spatial MIMO detector 107. The baseband range-Doppler detector 105 is further configured to detect one or more moving objects in the range-Doppler domain, estimate a range and a velocity of each of the detected moving objects.

For each detected moving object, the spatial MIMO detector 107 first chooses one of detected objects 133, extracts the measurements corresponding to the chosen object from all receivers, compensates the extracted measurements with the detected range and velocity of the chosen object 135 with additional option of a low-pass filter 137 to filter out signals attributed from other objects, and separate the compensated measurements by multiplying the codes used at the transmitter side 139. With the separated waveforms from all transmitter-receiver pairs, the spatial MIMO detector 107 employs a spatial-domain target detection scheme 140 to output the angle of detected objects.

It can be seen that the two-step detection (first on the Range-Doppler domain and then the spatial domain) avoids excessive computation at the spatial domain when no objects are detected in the Range-Doppler domain.

To that end, the baseband range-Doppler detector 105 is configured to combine waveforms obtained from the set of receivers. The baseband range-Doppler detector 105 is further configured to perform fast-time Fast Fourier transforms (FFT) on the combined waveforms to determine ranges of the detected one or more moving objects. The fast-time Fourier transform samples each transmitted pulse multiple times for range compression. The baseband range-Doppler detector 105 is further configured to perform slow-time FFT to determine velocities of the one or more moving objects. The slow-time FFT samples each transmitted pulse once for Doppler compression.

For example, consider a radar operating at a frequency (f) 70 GHz, then the wavelength ($\lambda$) of the radar can be calculated as: $\lambda$=c/f, where c is velocity of light. Therefore, $\lambda$=0.0043 m or 4.3 mm. When the vehicle based radar is travelling at 50 mph, is tracking a target ahead moving at 100 mph in the same direction. In this case, the speed differential is −50 mph, or −22.35 m/s. Another target is traveling head on toward the vehicle based radar at 40 mph. This gives a speed differential of 90 mph, or 40.2 m/s The Doppler frequency shift can be calculated as: f_Doppler=2v_relative/$\lambda$, which gives a Doppler shift of 2(−13.4 m/s)/(0.0043 m)=−10.40 kHz for the first object and a Doppler shift of 2(40.2 m/s)/(0.0043 m)=18.70 kHz for the second object. As mentioned above, the range and Doppler frequencies of objects are detected in the Range-Doppler domain with the help of the fast Fourier transform. That is, the Range-Doppler domain is divided into small grids with step sizes determined by the ADC sampling frequency, the number of pulses, and the pulse repetition interval (PRI). For the Doppler frequency, the Doppler domain is discretized into grids (also referred to Doppler filter sub-band) with a grid size given by 1/(T_PRI*K), where T_PRI is the PRI and K is the number of pulses used at the transmitter. For example, given T_PRI=5 microseconds and K=32, the grid size for the Doppler domain is about 6.25 kHz and the discretized grid will be integer multiple (between −K/2 and K/2) of 6.25 kHz. In this case, the first object would be likely detected at the Doppler grid at −2(6.25 kHz)=−12.50 kHz, and the second object would be likely detected at the Doppler grid at 3(6.25 kHz)=−18.75 kHz. By comparing these detected Doppler grids with the true (but unknown) Doppler frequencies at −10.40 kHz and 18.70 kHz, one can easily notice the presence of Doppler mismatch. Such Doppler mismatch will affect the waveform separation at the receiver side of the slow-time MIMO-FMCW automotive radar.

Thus, the baseband range-Doppler object detector 105 determines the number of objects detected from the scene, and estimates corresponding ranges and velocities from the discretized range and Doppler grids. However, the estimated ranges and velocities suffer from Doppler mismatches, which means that the estimated ranges and velocities are not true ranges and velocities of the moving object. Further, the Doppler mismatch is unknown, and it is difficult to calculate the unknown Doppler mismatch. If the Doppler mismatch is not considered, it may affect the accuracy of the radar system 100 to detect the spatial location of the moving objects.

Figure 1B:
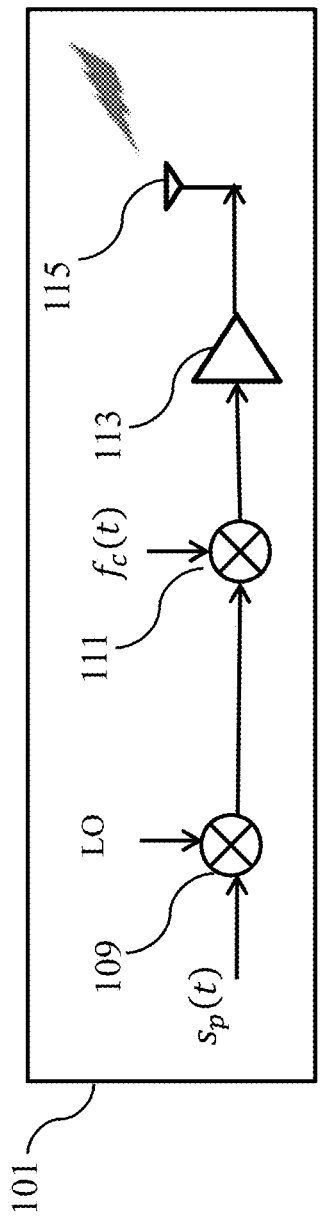
FIG. 1B illustrates an exemplary architecture of the transmitter, in accordance with some embodiments.
Figure 1C:
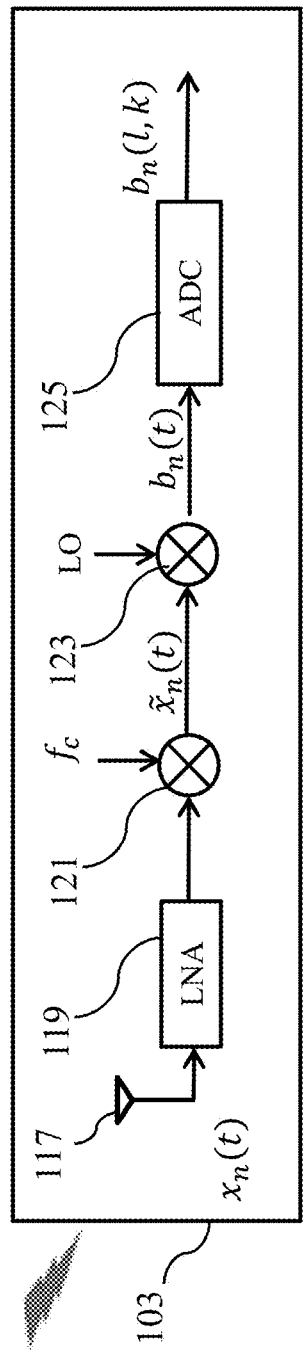
FIG. 1C illustrates an exemplary architecture of the receiver, in accordance with some embodiments.
Figure 1D:
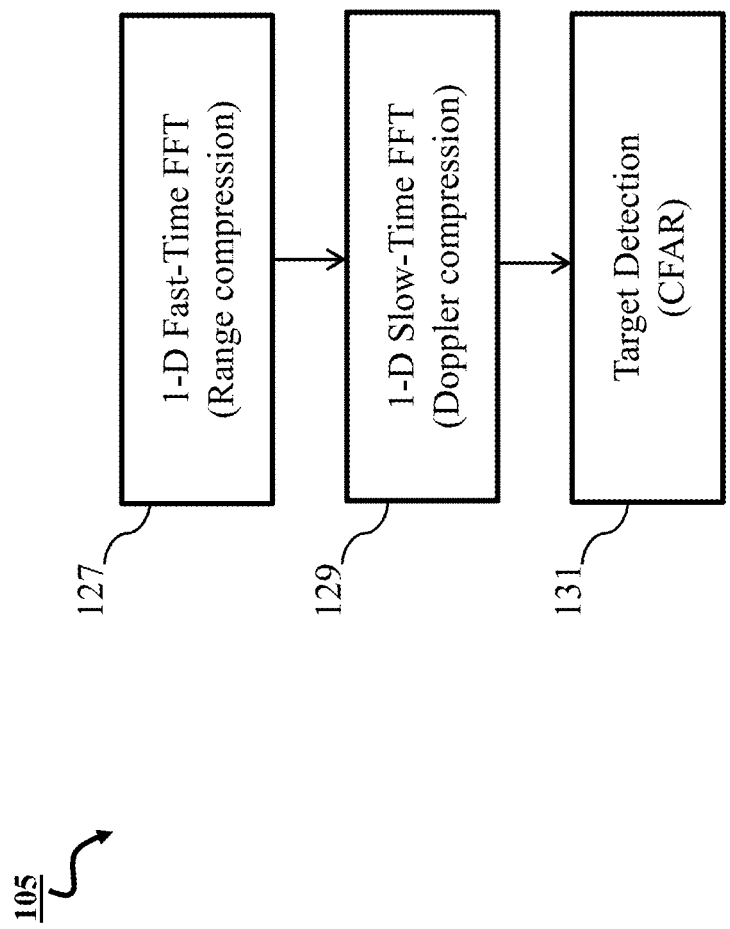
FIG. 1D illustrates steps of a method executed by the baseband range-Doppler object detector, in accordance with some embodiments.
Figure 1E:
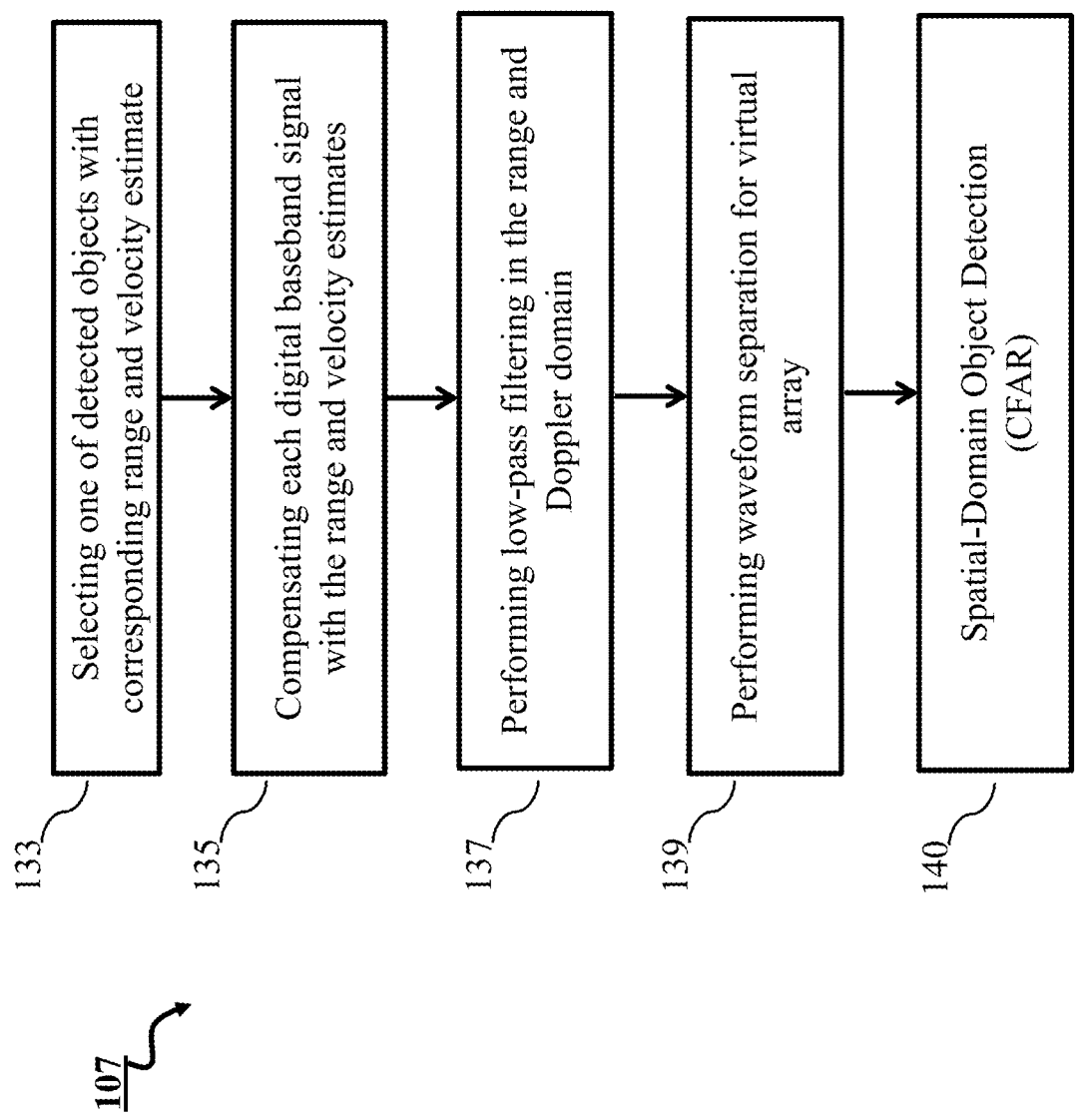
FIG. 1E illustrates steps of a method executed by the spatial MIMO detector module 107, in accordance with some embodiments.
Figure 1F:
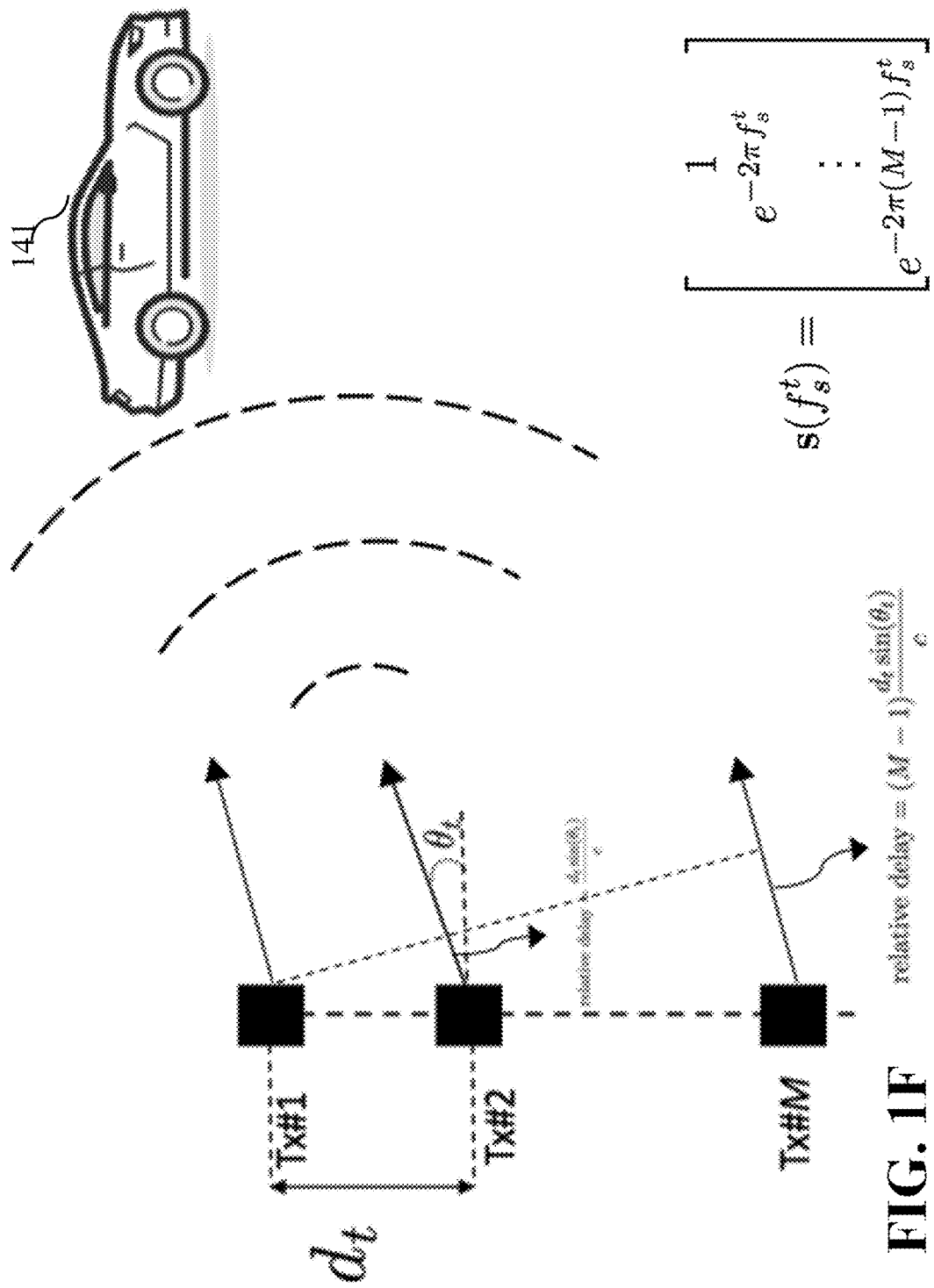
FIG. 1F is an exemplary scenario that illustrates the relation between the transmitter-object signatures and relative delays, in accordance with some embodiments.
Figure 1G:
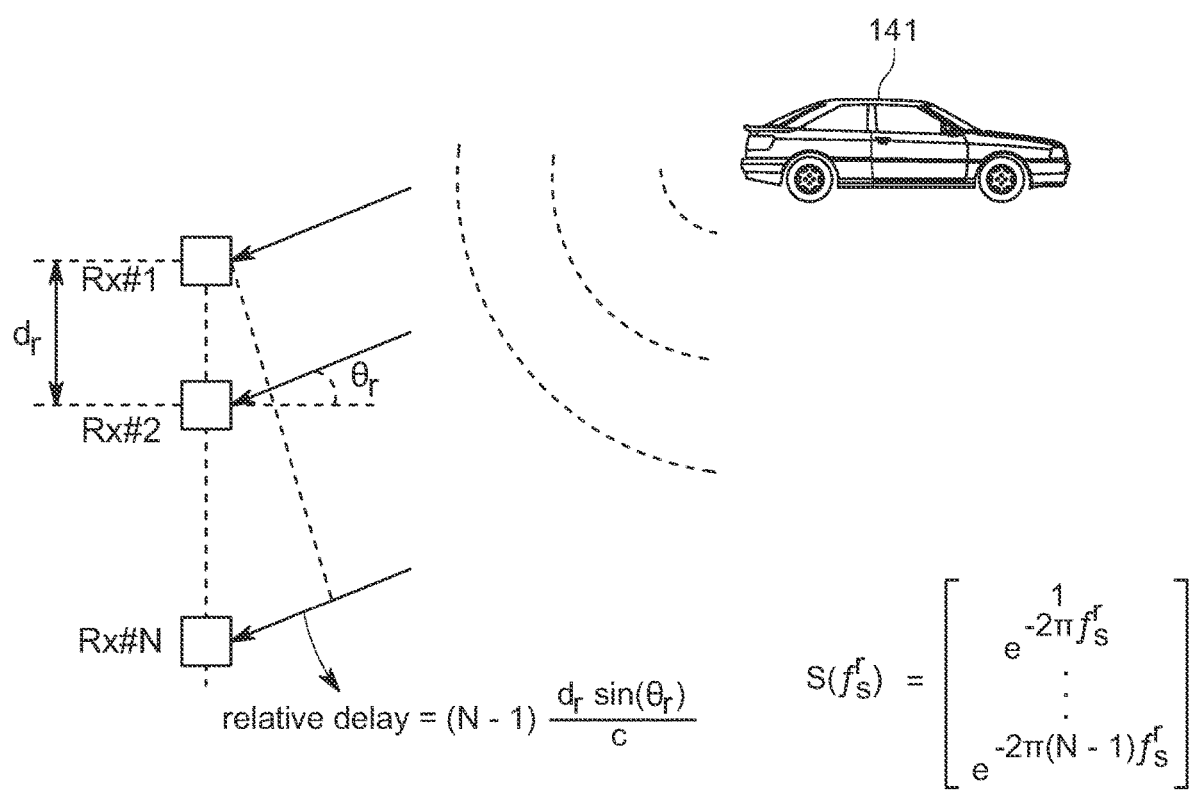
FIG. 1G is an exemplary scenario that illustrates the relation between the object receiver signature and relative delays, in accordance with some embodiments.

To address this issue, the radar system 100 uses the spatial MIMO detector 107 configured to utilize the maximum Doppler mismatch to identify significant residual terms and ignore negligible residual terms, and further to calculate accurate angle of the moving object i.e. spatial location of the moving object. To that end, the spatial MIMO detector 107 extracts waveforms, from the reflections of the transmissions, associated with an object of the detected one or more objects and further determine Doppler mismatch associated with the velocity of the object. In order to achieve that, the spatial MIMO detector 107 is further configured to use a proposed explicit signal model for pairwise separation of waveforms that is described earlier. The spatial MIMO detector 107 performs compensation and waveform separation for all the detected objects one after the other in all the direction i.e. from 0° to 180°. The proposed explicit signal model is realized mathematically using equation (1) given below $$x \approx \alpha s(f_s^r) \otimes s(f_s^t) + \alpha_r s(f_s^r) \otimes s_r(f_s^t, \Delta f_d) + w \quad (1)$$

where x is a signal vector that contains separated waveforms associated with each pairwise unique combination. The x comprises waveforms separated by each receiver of the receiver array using the explicit signal model. Each or at least some of the separated waveforms comprises different components such as an object signature, residual components, and noise, which are illustrated in FIG. 1K. The explicit signal model comprises an auto-correlation term (auto term) "$\alpha s(f_s^r) \otimes s(f_s^t)$" which is also referred to as the object signature. The auto-term of the explicit signal model captures decoded transmission of the transmitter-receiver pair. The object signature comprises a Kronecker structure between the object-receiver signature ($s(f_s^r)$) (explained with respect to FIG. 1G) and transmitter-object signature ($s(f_s^t)$) (explained with respect to FIG. 1F). Further, the explicit signal model comprises a cross-correlation term (cross-term) "$\alpha_r s(f_s^r) \otimes s_r(f_s^t, \Delta f_d)$" which is also referred to as the residual signature of the virtual array consisting all MN transmitter-receiver pairs. The cross-term of the explicit signal model captures residuals of different transmissions in the decoded transmission of the transmitter-receiver pair caused by the Doppler mismatch. The residual signature also has a Kronecker structure between the object-receiver signature ($s(f_s^r)$) (the same as the one in the object signature) and the transmitter-object residual signature ($s_r(f_s^t, \Delta f_d)$) (explained in FIG. 1L).

Figure 1J:
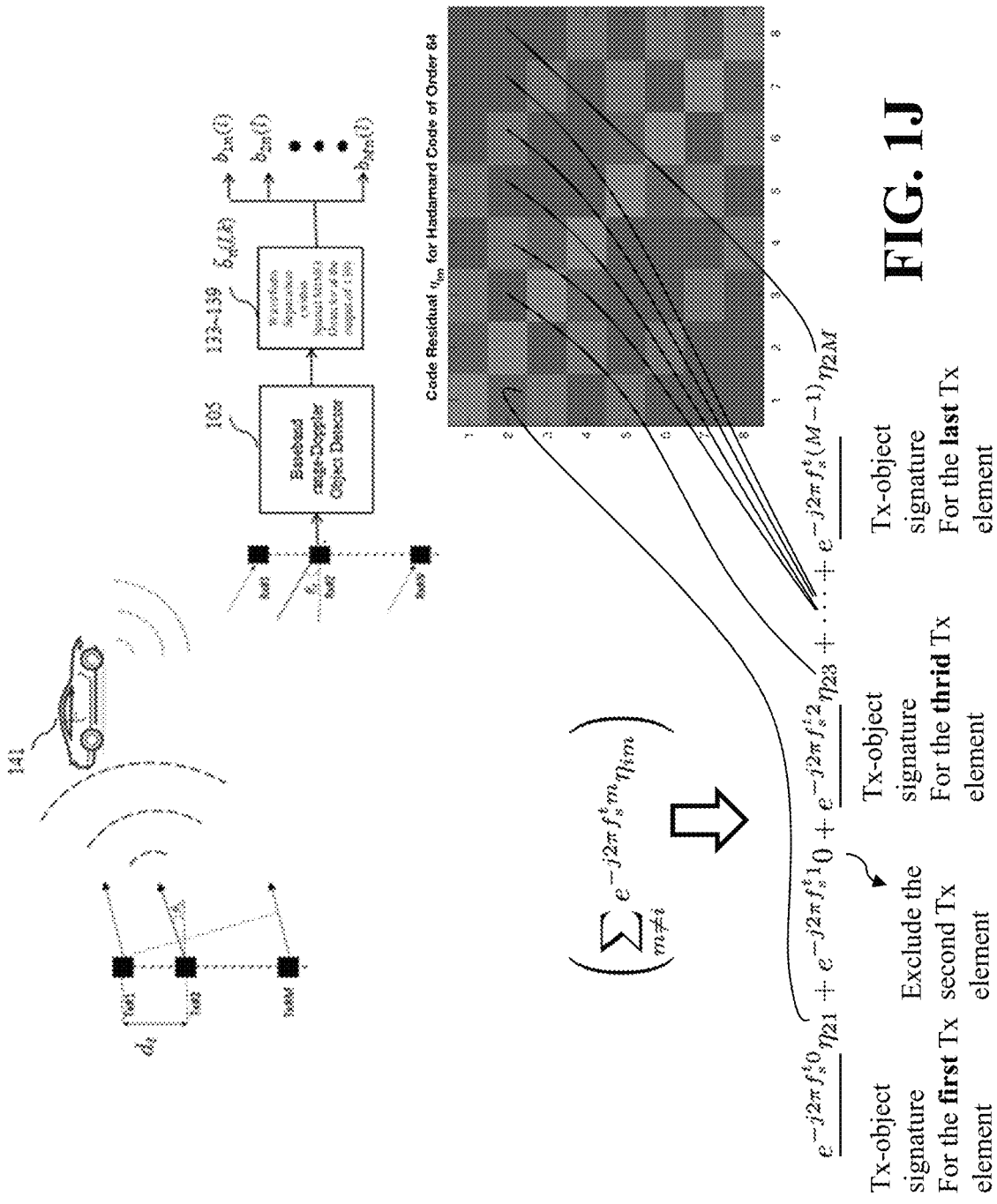
FIG. 1J illustrates an exemplary scenario for calculation of the transmitter-object residual signature for an element of the transmitter array, in accordance with an example embodiment.
Figure 1K:
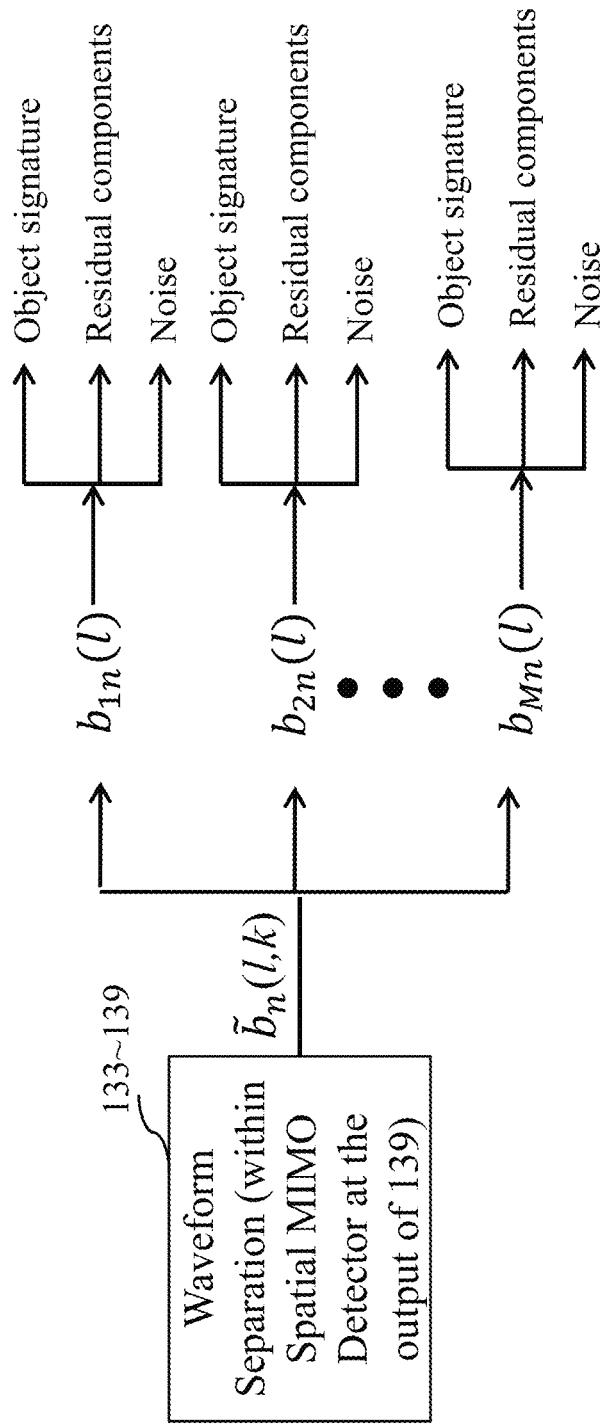
FIG. 1K illustrates waveform components comprised by the separated waveforms at each transmitter-receiver pair, in accordance with some embodiment.

As shown in FIG. 1J, each element in the transmitter-object residual signature ($s_r(f_s^t, \Delta f_d)$) is a weighted sum of transmitter-object signatures from all other transmitters where weights are as a function of the unknown Doppler mismatch. Thus, by including the residual signature due to Doppler mismatch in the extended signal model representing the measurements of the virtual array allows for more accurate estimation of the velocity of the moving object.

Additionally or alternately, some embodiments are based on understanding that the transmitter-object residual signature can be further approximated as a weighted sum of transmitter-object signatures from a limited number of transmitters by ignoring small weights identified by using a predetermined maximum Doppler mismatch.

Some embodiments are based on the recognition that all the transmissions from the M transmitters are to be considered together to determine the angle of the object. To that end, the spatial MIMO detector 107 is configured to combine together M separated waveforms from all the N receivers into a signal vector x of size MN Due to the way of combining/stacking M separated waveforms from each of the N receivers, the object signature is a Kronecker product between transmitter-object signature and object-receiver signature. Further, the signal vector comprises the residual signature that corresponds to waveform residuals occurring due to the Doppler mismatch. The spatial MIMO detector 107 is configured to use this signal vector x to determine angle of the moving object or the spatial location of the object. Thus, the spatial MIMO detector 107 takes into account the residual signature, which corresponds to the waveform residuals, in order to calculate spatial location of the moving object.

In another embodiment, the spatial MIMO detector may be implemented using a generalized likelihood ratio test (GLRT) algorithm, wherein the GLRT algorithm determines a GLRT statistic to detect the moving objects. The GLRT algorithm formulates object detection as a binary hypothesis. The spatial MIMO detector 107 initially generates the signal vector x as described above, and further pre-whitens the signal vector x. The spatial MIMO detector 107 may be based on a Kronecker subspace. The GLRT algorithm compares each of the hypothesis to a predetermined threshold and detects presence of the object at a particular angle from the range of angles 0° to 180°.

FIG. 1B illustrates an exemplary architecture of the transmitter, in accordance with some embodiments. FIG. 1B is an exemplary representation of all the components that may be present at each transmit element of all the M transmitters. Each transmit element first obtains a baseband FMCW signal waveform $s_p(t)$. The transmit element may obtain the baseband signal from a signal generator configured to generate FMCW signal waveforms $s_p(t)$. The baseband FMCW signal waveform can be defined as:

$$s_p(t) = \begin{cases} e^{j\pi\beta t^2} & 0 \le t \le T \\ 0 & \text{otherwise} \end{cases} \quad (2)$$

with $\beta$ denoting the chirp rate and T the pulse duration. The bandwidth of the FMCW waveform is $B=\beta T$. The baseband waveform $s_p(t)$ is repeated at each transmitter. The baseband signal is a sequence of pulses, for example a chirp signal. The signal is provided to a first local mixer/oscillator (LO) 109, where the baseband signal is encoded with orthogonal code for example, Hadamard code. Each pulse of the sequence of pulses of the baseband signal is encoded by a sequence of the orthogonal codes. Further, the encoded baseband signal is provided to a second local mixer 111, where the baseband signal is multiplied with a carrier frequency $f_c$. In an example embodiment, $f_c=79$ GHz. Further, the coded FMCW pulses are amplified by an amplifier circuitry 113 before transmitting the waveform towards the target via a transmitting antenna 115.

Therefore, the K coded FMCW pulses can be mathematically represented as $$S_m(t) = \Sigma_{k=0}^{k-1} c_m(k) s_p(t-kT_{PRI}) e^{j2\pi f_c(t-kT_{PRI})} \quad (3)$$

where m and k are, respectively, the indices for the transmitter and pulse. Further, $c_m(k)$ is the orthogonal code for the k-th pulse at the m-th transmitter, $T_{PRI}$ is the pulse repetition interval (PRI), $f_c$ is the carrier frequency (e.g., $f_c=79$ GHz), and $s_p(t)$ is the baseband FMCW waveform.

FIG. 1C illustrates an exemplary architecture of the receiver, in accordance with some embodiments. FIG. 1C is an exemplary representation of all components that may be present at each receive element of all the N receivers. As can be observed in the FIG. 1C, each receiver 103 receives a signal $x_n(t)$. At each receiver, the receiving antenna 117 provides the signal $x_n(t)$ to a liner noise amplification module (LNA) 119. The LNA 119 is an electronic amplifier that amplifies a very low-power signal without significantly degrading its signal-to-noise ratio. After amplification, the LNA 119 forwards the amplified signal to a first receiver-local mixer 121, where the received signal is demodulated using the carrier frequency $f_c$ that is used during modulation. The demodulated signal is represented by $\tilde{x}_n(t)$, where $$\tilde{x}_n(t) = x_n(t) e^{-j2\pi f_c t} \quad (4)$$

In an example embodiment, for an object at a distance of $R_0$ with a radial velocity $v_r$, the round-trip propagation delay from the m-th transmitting antenna to the n-th receiving antenna can be calculated using equation (5) as follows $$\tau_{mn}(t) = 2\frac{R_0 + v_t}{c} + m\frac{d_t \sin(\theta_t)}{c} + n\frac{d_r \sin(\theta_r)}{c} \quad (5)$$

where $d_{t/r}$ and $\theta_{t/r}$ are the inter-element spacing and azimuthal angle for the transmitting and receiving antennas, respectively, assuming collocated radars and the far field approximation, i.e., $\theta_r = \theta_t = \theta$ Therefore, when an object is present at an angle $\theta$, the signal demodulated by the n-th receiver is given as:

$$\tilde{x}_n(t) \approx \alpha \sum_m s_m(t-\tau_0) e^{-j2\pi f_c \tau_0} e^{-j2\pi(md_t+nd_r)\frac{\sin(\theta)}{\lambda}} \quad (6)$$

where $\tau_0 = \frac{2R_0}{c}$, $\lambda=c/f_c$, $s_m(t)$ is transmitted chirp sequence (or coded FMCW pulses) at transmitter m, and assuming that $s(t-\tau_{mn}) \approx s(t-\tau_0)$. Further, the demodulated signal $\tilde{x}_n(t)$ is provided to a second receiver-local mixer 123, and further mixed with the source FMCW pulse to generate a beat signal. Thus, the second local mixing compresses the FMCW signal into an analog baseband signal or the beat signal ($b_n(t)$), where $b_n(t)=\tilde{x}_n(t)\Sigma_k s_p^*(t-kT_{PRI})$. This can be further expanded for the k-th pulse as:

$$b_n^{(k)}(t) = \tilde{\alpha}\sum_m c_m(k)e^{j2\pi\beta\tau_t(t-kT_{PRI})}e^{-j2\pi f_c(2vt/c)}e^{-j2\pi(md_t+nd_r)\frac{\sin(\theta)}{\lambda}} \quad (7)$$

where term $\tilde{\alpha}$ absorbs additional phase terms and term $c_m(k)$ is slow-time code. The analog beat signal is then converted to digital signal using ADC 125 for further processing.

To that end, the analog beat signal $b_n^{(k)}(t)$ from each receiver is provided to the baseband range-object detector 105 where the beat signals from all the receiver is combined and is sampled at $t=kT_{PRI}+l\Delta T$, where $\Delta T$ and $T_{PRI}$ are, respectively, the fast-time and slow-time sampling intervals to generate:

$$b_n(l,k)=\tilde{\alpha}\Sigma_m c_m(k)e^{-j2\pi f_r l}e^{-j2\pi f_d k}e^{-j2\pi(f_s^t m+f_s^r n)} \quad (8)$$

where $f_r=(\beta\tau_0+2f_r v/c)\Delta T$ is normalized temporal (fast-time) frequency, $f_d=2 f_c T_{PRI}v/c$ is the normalized Doppler (slow-time) frequency, and $f_s^{t/r}$ is the normalized spatial frequency at the transmitters and receivers ($f_s^t$ is usually different from $f_s^r$ due to different Tx/Rx spacing). Therefore, the beat signal at the n-th receiver is the sum of object responses originated from all transmitted waveforms, coded using $c_m(k)$.

The digital beat signal $b_n(l, k)$ at the receiver n (Rx #n) is then provided to the baseband range-Doppler detector 105. The baseband range-Doppler detector 105 can be done separately at each receiver or collectively from all receivers. One simple way is to apply two one-dimensional FFTs to the digital beat signal $b_n(l, k)$ over l and k for each receiver n. As a result, at each receiver, one can compute the two-dimensional spectrogram by taking the magnitude of the two-dimensional FFT over (l, k). Then one can sum all two-dimensional spectrograms from all N receivers (over n) to suppress noise and interference, and compare the summed spectrogram with a proper threshold to declare a number of detected objects. The threshold is usually selected to meet a given probability of false alarm.

FIG. 1D illustrates steps of a method executed by the baseband range-Doppler object detector, in accordance with some embodiments. The baseband range-Doppler detector 105 obtains the digital beat signal $b_n(l, k)$ from all the N receivers and process the combined digital beat signal to detect one or more objects. As described earlier, the baseband range-Doppler object detector 105, determines the number of moving objects from the digital beat signal and further estimates ranges and velocities, corresponding to the detected one or more objects. To that end, the baseband object detection module 105 comprises a continuous false alarm rate (CFAR) circuitry. The CFAR enables the baseband range-Doppler object detector 105 to select a threshold to distinguish between a moving object and a stationary object.

To achieve this, the baseband range-Doppler object detector 105 performs sampling using a fast-time FFT and a slow-time FFT. At step 127, sampling the combined beat signals using one dimensional (1D) fast-time FFT to estimate ranges of the one or more moving objects detected in the combined beat signal. In the fast-time FFT, the combined beat signal is sampled frequently, i.e., multiple samples per pulse. As the frequencies of each pulse are modulated, it is relatively easy to determine ranges in the frequency domain.

For example, if the radar system 100 is implemented to estimate range of the moving object which is at a distance/range between R (0-100 meters). The radar system 100 uses K FMCW pulses to detect the object. Let L be the number of samples within each pulse. Then, the resolution/step size used for performing fast-time FFT on the combined beat signal is calculated as: resolution=R/L.

Further, at step 129, sampling the combined beat signals using one dimensional (1D) slow-time FFT to estimate velocities of the one or more moving objects detected in the combined beat signal. In slow-time FFT, the combined signal is sampled with one sample per pulse. The slow-time FFT uses less or limited number of pulses for sampling, which results in quantization of the velocity estimates as discussed earlier.

Thus, by performing two 1D FFTs the baseband range-Doppler object detector 105 calculates the threshold to be used for detecting presence of the moving objects. At step 131, comparing energy of the received signal with the threshold to detect whether a true object is present or not, and whether the object is moving or stationary. The threshold can be optimized by performing FFTs as $FFT_k\{FFT_l\{b_n(l, k)\}\}$.

Once objects are detected at the baseband Range-Doppler detector 105, the spatial MIMO detector 107 estimates azimuthal angle/elevation angle of the targets using waveform separation in the slow-time domain with identified Doppler frequency $\hat{f}_d$ to compensate the modulation. The received waveform can be separated in the slow-time domain using:

$$b_{in}(l)=\Sigma_k c_i(k)b_n(l,k)e^{j2\pi\hat{f}_d n}, i=1,\ldots,M \quad (9)$$

Therefore, a virtual array of unique pairwise combinations of the transmitters and the receivers can be formed using the set of transmitters i and the set of receivers n. The set of transmitters and the set of receivers are configured to detect the moving object using the slow-time MIMO radar transmissions. For a given range cell l, the waveform separation gives the Tx-Rx virtual array as $$b_{in}(l)=\tilde{\alpha}e^{-j2\pi f_r l}e^{-j2\pi f_s^r n}(e^{-j2\pi f_s^t i}\eta_{ii})+\tilde{\alpha}e^{-j2\pi f_r l}e^{-j2\pi f_s^r n}$$
$$(\Sigma_{m\neq i}e^{-j2\pi f_s^t m}\eta_{im}) \quad (10)$$

where $\eta_{im}=\Sigma_k c_m(k)c_i(k)e^{-j2\pi\Delta f_d k}$ measures the code residuals. Further, equation (8) reveals that after slow-time waveform separation, the virtual array of MN elements for each detected object can be formed. Further, the equation (9) can be further used to identify spatial extent of the detected object in the Tx-Rx element (i, n) domain.

The waveform at each virtual element (i, n) consists of two components: the object signal, weighted by $\eta_{ii}$, and the residual signal, a weighted sum of M−1 components weighted by $\eta_{im}$. If $\Delta f_d=0$, perfect waveform separation $b_{in}(l)=K\tilde{\alpha}_{in}e^{-j2\pi(f_s^t i+f_s^r n)}e^{-j2\pi f_r l}$ since $\eta_{ii}=K$ while $\eta_{im}=0$. However, a small mismatch in the Doppler domain may lead to significant leakage in the separated waveform. Further, a steering vector representing set of phase delays of the received waveform can be formed by stacking all MN virtual elements, with $\eta_{ii}=\eta$ $$b(l)\approx\alpha s(f_s^r)\otimes s(f_s^t)+s(f_s^r)\otimes(H_r(f_s^t)\zeta_r) \quad (11)$$

where $(\alpha s(f_s^r)\otimes s(f_s^t))$ is an auto-correlation term that includes a Kronecker product of object-receiver signatures and transmitter-object signatures, and $(s(f_s^r)\otimes(H_r(f_s^t)\zeta_r))$ is a cross correlation term that includes a Kronecker product of object-receiver signatures and a combination of residual transmitter-object signatures. The transmitter-object signature is a function of the relative angle between the transmitter and object, the wavelength of transmitted waveform, and the relative distance between the two consecutive transmitter elements. Similarly, the object-receiver signature is a function of the relative angle between the receiver and object, the wavelength of received waveform, and the relative distance between the two consecutive receiver elements. Further, the combination of residual transmitter-object signatures and the waveform separation residuals, comprise different combination of the transmitted signals with values below and above a threshold. The explicit signal model proposed in the disclosure considers elements of the waveform separation residuals with values above the threshold. The threshold may be predefined for the radar system.

FIG. 1E illustrates steps of a method executed by the spatial MIMO detector 107, in accordance with some embodiments. The spatial MIMO detector 107 determines the angle (azimuthal/elevation) of the object i.e. location of the object in spatial domain. At step 133, selecting one object from the one or more objects detected by the baseband range-Doppler object detector 105, and the corresponding range estimate and velocity estimate. For example, the baseband range-Doppler object detector 105 detects three objects and estimated their corresponding ranges and velocities. The baseband range-Doppler object detector 105 provides this information to the spatial MIMO detector 107. The spatial MIMO detector 107 then extracts waveforms associated with one object at a time and process it to determine spatial location of that object. The spatial MIMO detector 107 continues this iteratively for the remaining two objects.

At step 135, compensating the beat signal waveform corresponding to the selected object with the range estimate such that $\tilde{b}_n(l, k) = b_n(l, k) e^{j2\pi f_r l} e^{j2\pi f_d k}$, where $e^{j2\pi f_r l}$ provides compensation at range and $e^{j2\pi f_d k}$ provides compensation at Doppler. At step 137, performing a low-pass filtering in the range and Doppler domain which filters out residuals from other objects. At step 139, performing waveform separation for virtual array using the same orthogonal coding scheme that is used at the transmitter. But due to Doppler mismatch, the separation is not perfect and the separated waveforms comprise residuals from each or at least some transmitter-receiver pair of the virtual array. To consider these residuals, the explicit signal model expressed mathematically in equation (1) uses a cross-term. The residuals in the cross-term are functions of the unknown Doppler mismatch. Step 140 performs a spatial-domain object detection by recognizing the presence of the waveform separation residuals. The spatial MIMO detector 107 is configured to use the explicit signal model to estimate Doppler mismatch, which can later be used to accurately determine angle of the object.

After waveform separation, each transmitter-receiver virtual pair contains an object signature, residual components, and noise. Further, the separated waveforms from all the N receivers are combined in the signal vector x of size MN. The spatial MIMO detector 107 uses the signal vector x to determine the spatial location of each object.

FIG. 1F is an exemplary scenario that illustrates the relation between the transmitter-object signatures and relative delays, in accordance with some embodiments. As can be observed in the figure, each transmitter of the total M transmitters (or transmit elements) in the transmitter array transmits coded FMCW pulses or the radar signals towards the object 141 (for example car). Assuming that the object 141 is very far away from the transmitter array, then for the far field object (where transmitter to object distance is much larger than the wavelength), the relative propagation delay from one transmit element to another transmit element is based on: 1) relative angle (azimuth/elevation) of transmission between a transmitter and the object; and 2) the distance between the two transmitter elements. For instance, for a uniform linear transmitter array, a relative propagation delay from a second transmit element to the first transmit element is calculated using:

$$\text{relative delay} = \frac{d_t \sin(\theta_t)}{c} \quad (12)$$

where $d_t$ is the distance between two transmit elements of the transmitter array, $\theta_t$ is the angle of transmission between each transmitter and the object, and c is the speed of the light. Therefore, the relative delay from the M-th transmit element to the first transmit element can be calculated as $$(M-1)\frac{d_t \sin(\theta_t)}{c}.$$

The radar system can use the relative propagation delay to calculate relative phase delay. For example, the relative phase difference from the second transmit element to the first transmit element is calculated using $$\text{relative phase difference} = 2\pi f_c \frac{d_t \sin(\theta_t)}{c} = 2\pi \frac{d_t \sin(\theta_t)}{\lambda} \quad (13)$$

Therefore, for the relative phase difference between the M-th transmit element to the first transmit element is $$(M-1)2\pi \frac{d_t \sin(\theta_t)}{\lambda},$$

where the term $$\frac{d_t \sin(\theta_t)}{\lambda}$$

can be denoted by $f_s^t$. The proposed radar system then translates the relative phase delay to the transmitter-object signature. For example, from the second transmit element to the first transmit element the transmitter-object signature is given as $e^{-2\pi f_s^t}$. Similarly, from the M-th transmit element to the first element the transmitter-object signature is given as $e^{-2\pi(M-1)f_s^t}$. Further, by grouping transmitter-object signature from all transmit elements together into a vector, the transmitter-object signature of the transmitter array can be represented mathematically as follows:

$$s(f_s^t) = \begin{bmatrix} 1 \\ e^{-2\pi f_s^t} \\ \vdots \\ e^{-2\pi(M-1)f_s^t} \end{bmatrix} \quad (14)$$

FIG. 1G is an exemplary scenario that illustrates the relation between the object receiver signature and relative delays, in accordance with some embodiments. As can be observed from the figure, each receiver (or receive element) of the total N receivers receives the echo pulse from the object 141 (for example, a car). Assuming that the object is very far away from the receiver array, then for the far field object (where receiver to object distance is much larger than the wavelength), the relative propagation delay from one receive element to another receive element is based on: 1) relative angle (azimuth/elevation) of arrival between a receiver and the object; and 2) the distance between the two receive elements. For instance, for a uniform linear receiver array, a relative propagation delay from a second receive element to the first receive element is calculated using:

$$\text{relative delay} = \frac{d_r \sin(\theta_r)}{c} \quad (15)$$

where $d_{tr}$ is the distance between two transmit elements of the transmitter array, $\theta_t$ is the angle between each receiver and the object, and c is the speed of the light. Therefore, the relative delay from the M-th receive element to the first receive element can be calculated as $$(N-1)\frac{d_r \sin(\theta_r)}{c}.$$

The radar system can use the relative propagation delay to calculate relative phase delay. For example, the relative phase difference from the second receive element to the first receive element is calculated using $$\text{relative phase difference} = 2\pi f_c \frac{d_r \sin(\theta_r)}{c} = 2\pi \frac{d_r \sin(\theta_r)}{\lambda} \quad (16)$$

Therefore, for the relative phase difference between the N-th receive element to the first receive element is $$(N-1)2\pi \frac{d_r \sin(\theta_r)}{\lambda},$$

where the term $$\frac{d_r \sin(\theta_r)}{\lambda}$$

can be denoted by $f_s^r$. The proposed radar system then translates the relative phase delay to the receiver-object signature. For example, from the second receive element to the first receive element the object-receiver signature is given as $e^{-2\pi f_s^r}$. Similarly, from the N-th receive element to the first receive element the object-receiver signature is given as $e^{-2\pi(N-1)f_s^r}$. Further, by grouping object-receiver signature from all receive elements together into a vector, the object-receiver signature of the receiver array can be represented mathematically as follows:

$$s(f_s^r) = \begin{bmatrix} 1 \\ e^{-2\pi f_s^r} \\ \vdots \\ e^{-2\pi(N-1)f_s^r} \end{bmatrix} \quad (17)$$

FIG. 1H illustrates the waveform separation within a spatial MIMO detector, in accordance with some embodiments. Examplar analysis of the waveforms separated at the output of the step 139 illustrated in FIG. 1E is provided herewith reference to FIG. 1H. As can be observed from the FIG. 1H, the spatial MIMO detector 107 separates waveform associated with the unique pairwise combination from the received echo signal $x_n(t)$. For each receive element, the received signal $x_n(t)$ is separated into M waveforms (with waveform separation at slow-time domain). By grouping M waveforms each receive element of the N receive elements, there will be total MN waveforms from the virtual array of MN transmit-receive elements. All these separated waveforms are combined in the signal vector x of dimension MN. FIG. 1I shows an exemplary signal vector containing separated waveforms of each transmitter-receiver pair, according to an example embodiment. As can be observed from FIG. 1I, the vector x comprises separated waveforms from the first receiver $b_{11}$, $b_{21}$, to $b_{M1}$ to separated waveforms from N-th receiver $b_{M1}$, $b_{M1}$, to $b_{MN}$. Thus, for the virtual array of MN elements (M transmit elements, N receive elements), the object signature is given as $s(f_s^t) \otimes s(f_s^r)$, and the overall object signature including unknown object amplitude is given as $s = \alpha s(f_s^t) \otimes s(f_s^r)$.

FIG. 1J illustrates an exemplary scenario for calculation of the transmitter-object residual signature for an element of the transmitter array, in accordance with an example embodiment. As can be observed in the figure, each transmitter of all the M transmitters transmit the set of frequency modulated pulses towards the object 141. Each receive element of the N receivers obtain reflected transmissions or echo signal from the object 141. The reflected transmissions are processed by the baseband range-Doppler object detector 105 and the spatial MIMO detector 107 as explained earlier. The spatial MIMO detector 107 performs waveform separation. Considering waveform separation for n-th receiver, the separated waveforms will be $b_{1n}(l)$, $b_{2n}(l)$, ..., $b_{Mn}(l)$. The combinations of transmitter-object residual signature (or residual transmitter-object signature) of a receive element for a transmitter is a weighted summation of residual transmitter-object signatures of all other M transmitters except for that transmitter, where the weights are code residuals and the code residuals are functions of Doppler mismatch $\Delta f_d$. Therefore, the transmitter-object residual signature of a transmitter (or an element of the transmitter array) is given as $$(\Sigma_{m \neq i} e^{-j2\pi f_s^t(m-1)} \eta_{im}) \quad (18)$$

where $\eta_{im} = \Sigma_k c_m(k) c_i(k) e^{-j2\pi \Delta f_d k} \quad (19)$ with $c_m(k)$, $c_i(k)$ given by the orthogonal codes used at the transmitter m and transmitter i, respectively.

Thus, the transmitter-object residual signatures of an element of the transmitter array includes the transmitter-object signatures of all transmitters with an exception of the transmitter of the transmitter-receiver pair, where a value of a residual transmitter-object signature of a particular transmitter is a function of a Doppler mismatch between an actual velocity of the moving object and the velocity estimated by the baseband detector. The value of a residual transmitter-object signature of a particular transmitter is set to zero when a maximum value of the residual transmitter-object signature of the particular transmitter determined for a maximum Doppler mismatch is less than a threshold. Because, if the Doppler mismatch for a particular transmitter-receiver pair is very small then corresponding Doppler mismatch can be neglected i.e. $\Delta f_d = 0$, then equation (19) will be reduced to $\eta_{im} = \Sigma_k\, c_m(k) c_i(k)$. Now as the codes $c_m(k)$, $c_i(k)$ are orthogonal, $\eta_{im}=0$ for that transmitter-receiver pair. Consequently, the residual transmitter-object signature for the corresponding transmitter-receiver pair will also be zero. Thus, the calculation of the transmitter-object residual signatures of a transmitter in equation (18) is simplified by setting some residual transmitter-object signature to zero.

Further, for the exemplary scenario illustrated in FIG. 1J, consider a transmitter array with eight transmitters and a receiver array with eight receivers forming a virtual array for measurement of reflected transmissions. Each transmit element sends K=64 pulses (so codes for each transmit element). In the figure, rows correspond to eight transmitters and columns correspond to receivers. Suppose, at the second receiver, one wants to extract the waveform corresponding to second transmitter, then the transmitter-object signature for the auto term (object signature) is $e^{-j2\pi f_s^t 1}$, while the transmitter-object residual signature for the cross term(residual signature) is the weighted sum shown by equation (18).

Each weight in the bottom equation is given by the code residual which is a function of codes used at the transmitters, the Doppler mismatch, and the number of pulses. (sum of all other cross-terms) according to equation (18) is given as:

$$\Sigma_{m\neq 2} e^{-j2\pi f_s^t(m-1)} \eta_{2m} = e^{-j2\pi f_s^t 0} \eta_{21} + e^{-j2\pi f_s^t 1} 0 + e^{-j2\pi f_s^t 2} \eta_{23} + \ldots + e^{-j2\pi f_s^t (M-1)} \eta_{2M} \quad (20)$$

where magnitudes of each element in equation (20) s represented in the figure with different shades. Different shades are exemplary representation of the transmitter-object residual signature for a transmitter at a given receiver, which is a weighted sum of all other transmitter-object signatures from all other transmitter-receiver pairs. For the separated waveform associated with the transmit element 2, waveforms from other transmitters act as interference or residuals. Therefore, transmitter-object signature corresponding to the second transmit element is excluded by setting $\eta_{22}=0$, and transmitter-object signature corresponding to other transmit element are considered, which provides sum of all the residuals with respect to a particular transmitter (in this case transmitter 2). In order to consider the effect of residuals, the transmitter object residual signature obtains sum of all the residuals with respect to the transmit element 2.

Further, grouping transmitter-object signatures from all transmitter elements into a vector, the transmitter-object residual signature of the transmitter array (M elements) is given as $$s_r(f_s^t, \Delta f_d) = \begin{bmatrix} \left(\sum_{m\neq 1} e^{-j2\pi f_s^t(m-1)} \eta_{1m}\right) \\ \left(\sum_{m\neq 2} e^{-j2\pi f_s^t(m-1)} \eta_{2m}\right) \\ \vdots \\ \left(\sum_{m\neq M} e^{-j2\pi f_s^t(m-1)} \eta_{Mm}\right) \end{bmatrix} \quad (21)$$

where each element of the vector $s_r(f_s^t, \Delta f_d)$ is the transmitter-object residual signature for the corresponding transmitter.

FIG. 1K illustrates waveform components comprised by the separated waveforms at each transmitter-receiver pair, in accordance with some embodiment. The spatial MIMO detector 107 performs waveform separation and generates waveforms $b_{1n}(l), b_{2n}(l), \ldots, b_{Mn}(l)$. Each of these separated waveforms comprises object signature, residual components due to imperfect waveform separation, and noise. For the virtual array of MN elements the residual signature is given as: $s(f_s^r) \otimes s_r(f_s^t, \Delta f_d)$, where $s(f_s^r)$ is object-receive signature of the receiver array, and $s_r(f_s^t, \Delta f_d)$ is transmitter-object signature of the transmitter array as expressed mathematically in equation (20). The overall residual signature including unknown amplitude is given as: $s_r = \alpha_r s(f_s^r) \otimes s_r(f_s^t, \Delta f_d)$. The residual signature is a Kronecker product between object-receiver signature and transmitter-object residual signature. The object signature and residual signature shares the same object-receiver signature but different transmitter-object signatures.

Figure 1L:
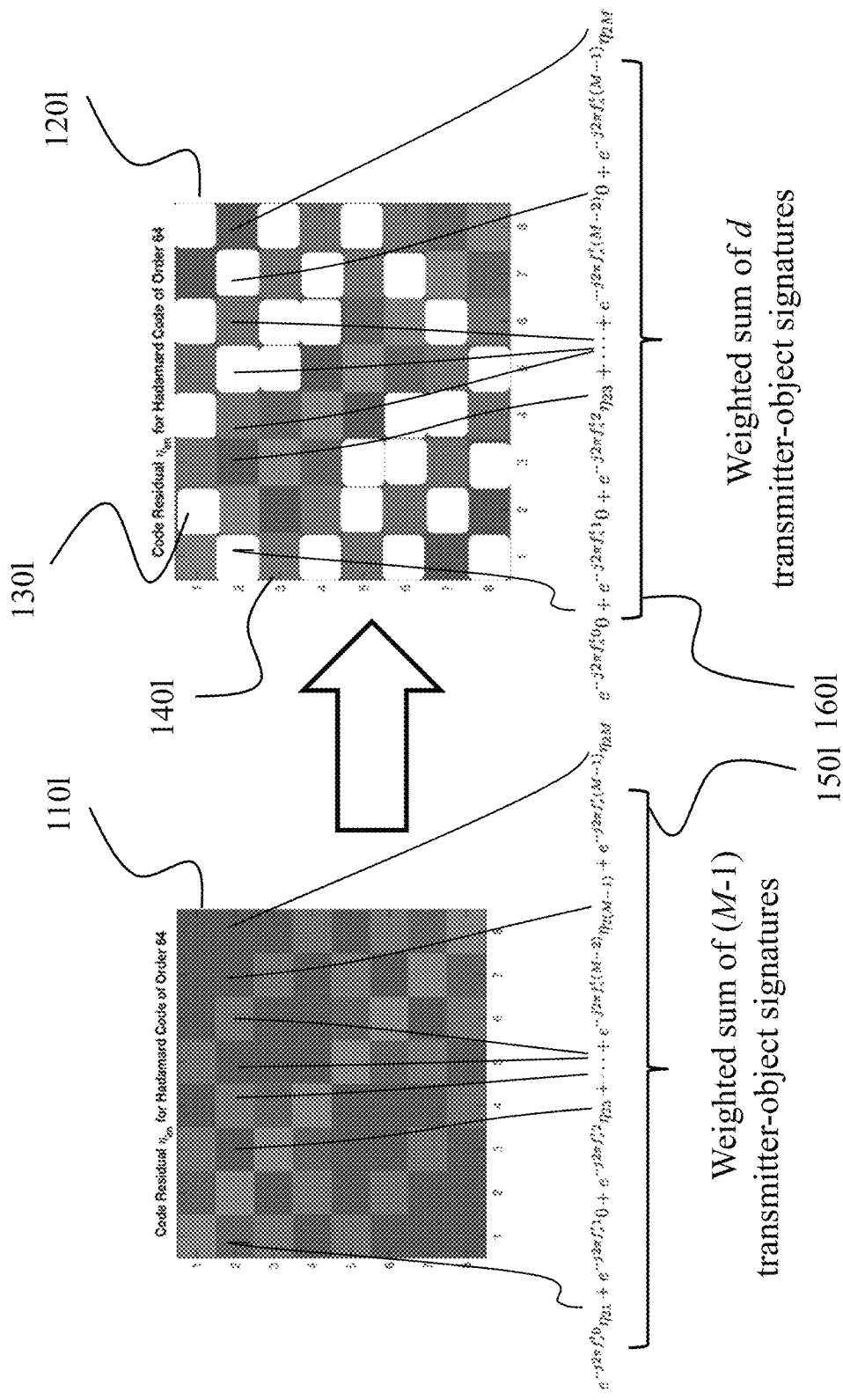
FIG. 1L and FIG. 1M illustrate an exemplary schematic of the subspace transmitter-object residual signature for the transmitter array, in accordance with some embodiments.
Figure 1M:
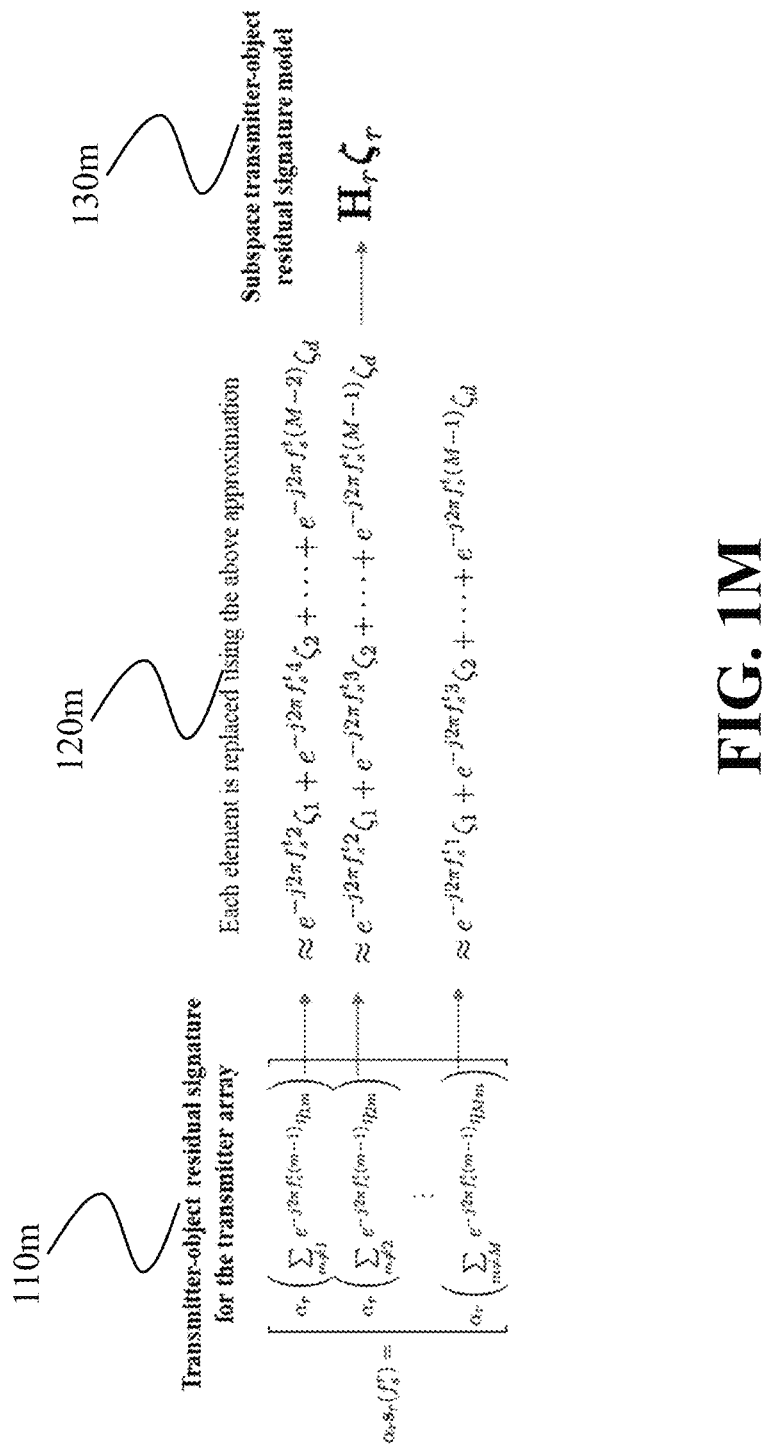

FIG. 1L and FIG. 1M illustrate an exemplary explanation of the subspace transmitter-object residual signature for the transmitter array, in accordance with some embodiments. As explained in FIG. 1J and (18) (or (20)), the transmitter-object residual signature of a transmitter is a weighted sum of transmitter-object signature from all other transmitters where the weights of (19) are a function of unknown Doppler mismatch, the codes used at the transmitters, and the number of pulses K. Some embodiments are based on recognition that the values of unknown Doppler mismatch are bounded by maximum Doppler mismatches that depend on configuration of MIMO radar system known in advance. Hence, some embodiments replace the unknown Doppler mismatch with a predetermined maximum Doppler mismatch (e.g., half of the Doppler grid size used in the Range-Doppler object detection), such as illustrated in check-box schematic 110*l* for exemplar Hadamard code. In addition, some embodiments are based on recognition that if the maximum Doppler mismatch provide small contribution to the cross-term of the extended signal model, the terms of the combination of residuals in the cross term corresponding to maximum Doppler mismatch with small contribution, i.e., small weights, can be removed. This principle is illustrated in approximation 120*l* having the locations 130*l* of small weights (e.g., below a certain threshold) identified as white boxes in contrast with other locations 140*l*.

By approximating the small code residual terms (illustrated as dark boxes schematic 110*l*) with zeros (white boxes in the schematic 120*l*), the (Tx-object) residual signature is approximated a weighted sum of (Tx-object) object signature from a limited number of transmitters (as opposed to the originally all other transmitters), which renders a subspace model for the transmitter-object residual signature. The locations of small code residuals (white boxes) are identified by using a predetermined maximum Doppler mismatch, the code used at transmitters and the number of pulses.

As a result, instead of counting all other transmitters, the transmitter-object residual signature 150*l* of a transmitter is approximated a weighted sum 160*l* of transmitter-object signature only from a limited number (d) of transmitters. For the example used for (20), it means $$\Sigma_{m\neq 2} e^{-j2\pi f_s^t(m-1)} \eta_{2m} \approx e^{-j2\pi f_s^t 0} \zeta_1 + e^{-j2\pi f_s^t 1} 0 + e^{-j2\pi f_s^t 2} \zeta_3 + \ldots + e^{-j2\pi f_s^t (M-1)} \zeta_d \quad (22)$$

As shown in FIG. 1M, all elements of (21), i.e., the transmitter-object residual signature 110*m* for the full transmitter array can be individually approximated 120*m* by ignoring corresponding small weights. More particularly, by only including the largest d weights to compute the weighted sum for each element of (21), the transmitter-object residual signature for the full transmitter ararry can be approximated by a subspace signal 130*m*:

$$\alpha_r s_r(f_s^t, \Delta f_d) \approx H_r \zeta_r \quad (23)$$

where transmitter-object residual subspace matrix $H_r(f_s^r) \in \mathbb{C}^{M \times d}$ is $$H_r(f) = \begin{bmatrix} e^{-j2\pi f} & e^{-j2\pi f2} & \cdots & e^{-j2\pi fd} \\ 1 & e^{-j2\pi f2} & \cdots & e^{-j2\pi fd} \\ \vdots & \vdots & & \vdots \\ 1 & e^{-j2\pi f2} & \cdots & e^{-j2\pi fd} \end{bmatrix} \quad (25)$$

with d denoting the subspace dimension.

Using the subspace model for the transmitter-object residual signature of the transmitter array in the full signal model of the virtual array, the residual signature of the virtual array (for MN virtual pairs of M transmitters and N receivers) can be approximated as a Kronecker subspace signal $$s_r = \alpha_r s(f_s^r) \otimes s_r(f_s^t, \Delta f_d) \approx s(f_s^r) \otimes (H_r(f)\zeta_r) \quad (24)$$

Therefore, the explicit signal model of equation (1) approximated as follows:

$$x \approx \alpha s(f_s^r) \otimes s(f_s^t) + s(f_s^r) \otimes (H_r(f_s^t)\zeta_r) + w \quad (26)$$

where $\alpha s(f_s^r) \otimes s(f_s^t)$ is the object signature of the full virtual array, $s(f_s^r) \otimes (H_r(f_s^t)\zeta_r)$ is the residual signature of the full virtual array, and w is the noise for all MN transmitter-receiver pairs.

If one assumes perfect waveform separation, the explicit signal model for the full virtual array reduces to the one used in the literature, $x \approx \alpha s(f_s^r) \otimes s(f_s^t) + w$.

Figure 2A:
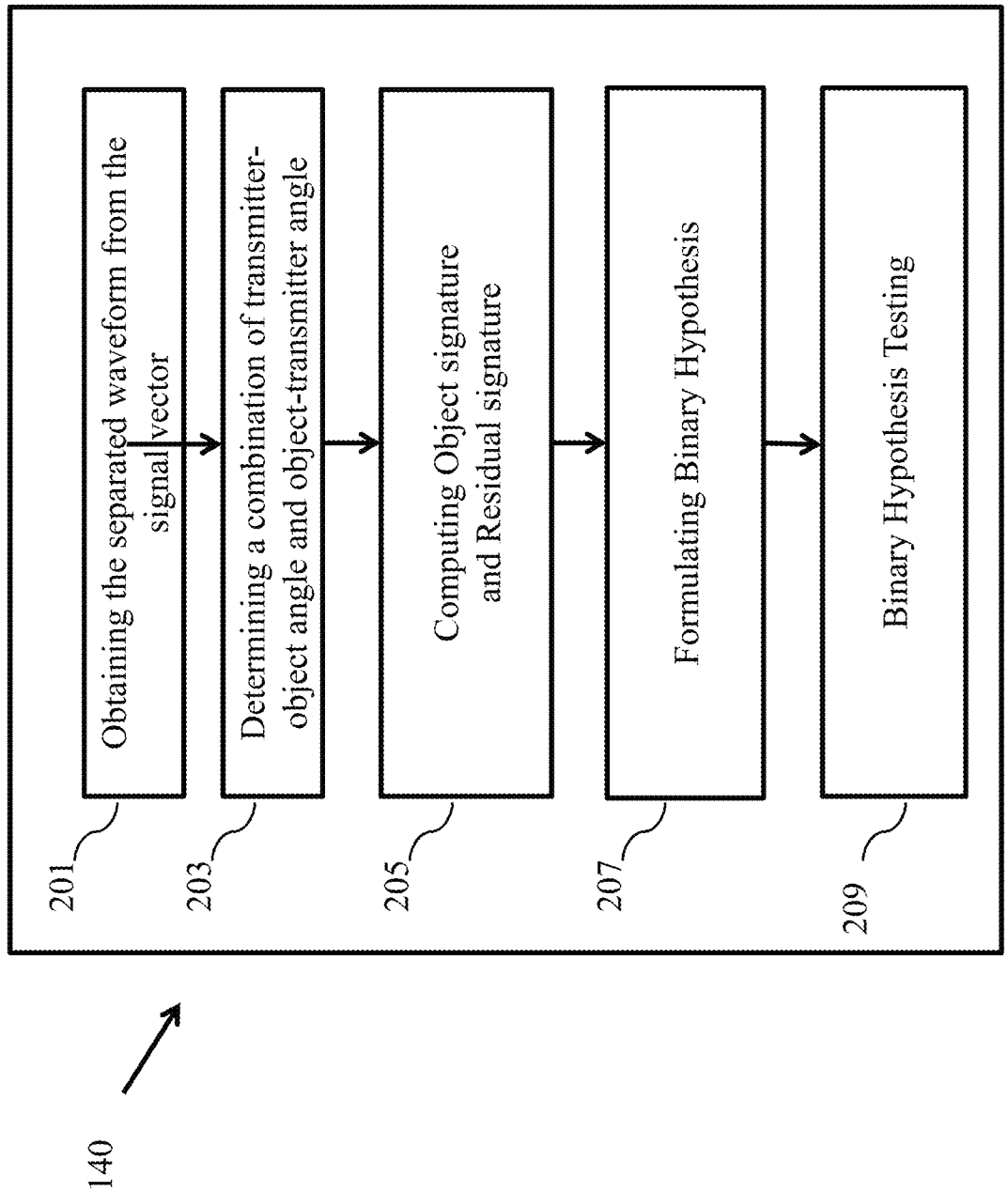
FIG. 2A illustrates steps to implement the spatial-domain MIMO detector, in accordance with an example embodiment.

FIG. 2A illustrates steps to implement the spatial-domain MIMO object detector, in accordance with an example embodiment. The steps are implemented after the waveform separation at step 139 as explained earlier with respect to FIG. 1E. After the waveform separation at step 139, one can obtain the separated waveform from the signal vector x at step 201. At step 203, determining all combinations of transmitter-object angle and object-transmitter angle iteratively till all the possible angles in the range 0° to 180°. Further, at step 205 computing the object signature and the residual signature (as discussed earlier) for each of the combination. At step 207 formulating object detection and spatial localization as a binary hypothesis testing problem in the presence of the residual waveform. The binary hypothesis is represented in equation (27)

$$H_0: x = w(l),$$

$$H_1: x = \alpha s(f_s^r) \otimes s(f_s^t) + s(f_s^r) \otimes (H_r(f_s^t)\zeta_r) + w \quad (27)$$

where the disturbance is assumed to be Gaussian distributed with zero mean and covariance matrix R, i.e., $w \sim CN(0, \sigma^2 R)$. First hypothesis $H_0$ defines that the separated waveform only contains the noise/interference/disturbance i.e. no object is present at the assumed transmitting and receiving angles. The second hypothesis $H_1$ defines that the separated waveform only contains 1) the object signature at the assumed angles; 2) the residual signature; and 3) the noise/interference/disturbance. Further, at step 209 testing the binary hypothesis to determine presence of object at all combinations of transmitter-object angle and object-transmitter angle in the range 0° to 180°.

Figure 2B:
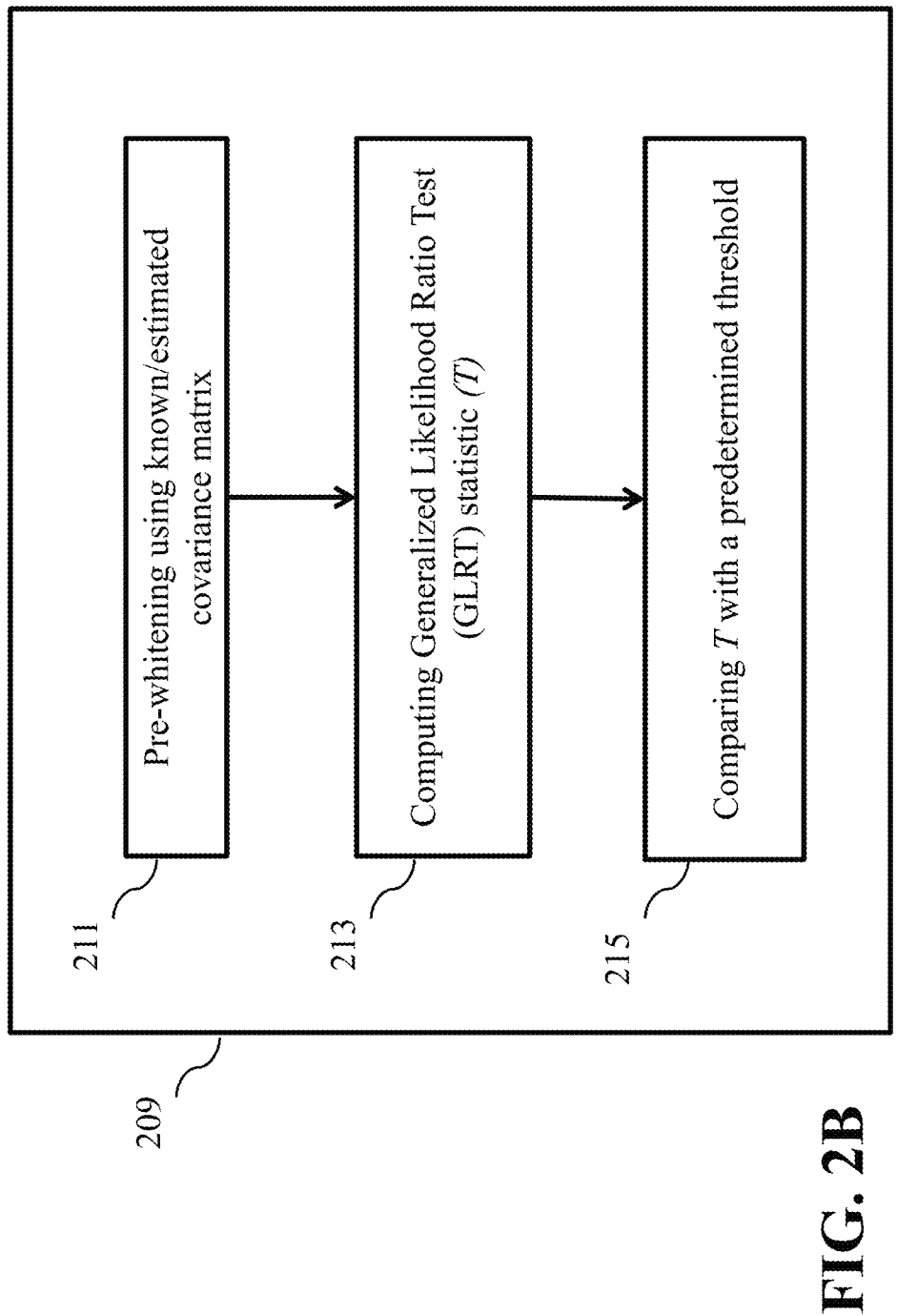
FIG. 2B illustrates a method to implement the binary hypothesis testing by using GLRT algorithm, in accordance with an example embodiment.

FIG. 2B illustrates a method to implement the binary hypothesis testing by using the GLRT algorithm, in accordance with an example embodiment. Detail analysis for implementation of the binary hypothesis testing illustrated in step 209 of FIG. 2A is explained below with respect to FIG. 2B. After obtaining the separated waveforms from the signal vector, at step 211, pre-whitening the signal vector using known/estimated covariance matrix R, where the covariance matrix corresponds to disturbances in the signal vector. In case where R is unknown, it can be estimated from training signals at neighboring range cells.

At step 213, with known R or estimated $\hat{R}$, the signal separated from the superposition of the transmitted signals is whitened using $y = R^{-1/2}x$ mapping detection to the following binary hypothesis test:

$$H_0: y \sim CN(0, \sigma^2 I),$$

$$H_1: y \sim CN(R^{-1/2}(s \otimes (\alpha \tilde{i} + (H_r(f_s^t)\zeta_r))), \sigma^2 I) \quad (28)$$

Assuming that R has the Kronecker structure $R = R_N \otimes R_M$, steering vectors (i.e. transmitter-object signature and object-receiver signature) $\{s(f_s^t), s(f_s^r)\}$ with dimensions M and N, respectively, and the transmitter-object residual subspace matric $H_r$ are assumed to be known.

Further, at step 213, using pre-whitened separated waveforms and signature for computing GLRT statistic T which can be derived as the ratio of maximized likelihoods under both hypotheses. The GLRT statistic is given as:

$$T = \frac{\max_{\alpha, \eta, \sigma^2} f_1(y | \alpha, \eta, \sigma^2)}{\max_{\alpha} f_0(y | \sigma^2)} \quad (29)$$

where T is the test statistic (or GLRT statistic), and $f_0(y|\sigma^2)$ and $f_1(y|\alpha, \eta, \sigma^2)$ are respectively, the likelihood functions of the whitened signal $$f_0(y | \sigma^2) = \frac{e^{-\frac{1}{\sigma^2} y^H y}}{(\pi \sigma^2)^{MN}} \quad (30)$$

$$f_1(y | \alpha, \eta, \sigma^2) = \frac{e^{-\frac{1}{\sigma^2} \|y - \tilde{s} \otimes (\alpha \tilde{i} + H\eta)\|^2}}{(\pi \sigma^2)^{MN}}$$

By differentiating $\ln f_1(y|\alpha, \eta, \sigma^2)$ w.r.t $\sigma^2$ and setting it to zero, the maximum likelihood (ML) estimate of $\sigma^2$ under $H_1$ $$\hat{\sigma}^2 = \frac{1}{MN} \|y - \tilde{s} \otimes (\alpha \tilde{i} + H\eta)\|^2 \quad (31)$$

Then the ML estimate of the remaining parameters $\beta = [\alpha, \eta_T]^T$ can be determined by minimizing the following cost functions $$\|y - \tilde{s} \otimes (\tilde{H}_t \beta)\|^2 \quad (32)$$

where $\tilde{H}_t = [\tilde{H}, \tilde{t}]$. Further, the ML estimate of $\beta$ follows:

$$\hat{\beta} = [(\tilde{s}^H \tilde{s})^{-1} \tilde{s}^H \otimes (\tilde{H}_t^H \tilde{H}_t)^{-1} \tilde{H}_t^H] y \quad (33)$$

By substituting $\hat{\beta}$ back to the cost function, equation (33) can be obtained $$\|y - \tilde{s} \otimes (\tilde{H}_t \hat{\beta})\|^2 = \left\| y - \tilde{s} \otimes \left[ ((\tilde{s}^H \tilde{s})^{-1} \tilde{s}^H \otimes P_{\tilde{H}_t}) y \right] \right\|^2 \quad (34)$$

$$= \left\| y - (P_{\tilde{s}} \otimes P_{\tilde{H}_t}) y \right\|^2$$

$$= y^H P^\perp_{\tilde{s} \otimes \tilde{H}_t} y$$

In the equation (33) the Kronecker product property that $(A\otimes B)(C\otimes D)=(AC)\otimes(BD)$, and $P_A^\perp = I - A(A^H A)^{-1}A^H = I - P_A$. As a result, the maximized likelihood under $H_1$ is given by:

$$\max_{\beta,\sigma^2} f_1(y \mid \beta\sigma^2) = \left(\frac{\pi}{MN} y^H P_{\tilde{s}\otimes\tilde{H}_t}^\perp y\right)^{-MN} \quad (35)$$

Similarly, under $H_0$ the maximized likelihood is given by:

$$T = \frac{y^H y}{y^H P_{\tilde{s}\otimes\tilde{H}_t}^\perp y} \to T' = T - 1 = \frac{y^H P_{\tilde{s}\otimes\tilde{H}_t} y}{y^H P_{\tilde{s}\otimes\tilde{H}_t}^\perp y} \quad (36)$$

Thus, the GLRT statistic (T) determined by the GLRT algorithm is equivalent to ratio of energy of the whitened signal projected onto a subspace and an orthogonal complement of the subspace, where the subspace is spanned by the Kronecker product of the column space of whitened transmitting steering vector $\tilde{s}$ and the whitened subspace $\tilde{H}_t$ for the waveform residuals. Further, at step 215, comparing the GLRT statistic T with a predetermined threshold to determine which of the two hypothesis is true. When it is determined that hypothesis $H_1$ is true, the object at the assumed combination of transmitter-object angle and object-transmitter angle is detected by the spatial MIMO detector 107 from the received separated waveforms. The spatial MIMO detector continues to perform binary hypothesis for all the combinations of the transmitter-object angle and object-transmitter angle that range from 0° to 180°.

Figure 2C:
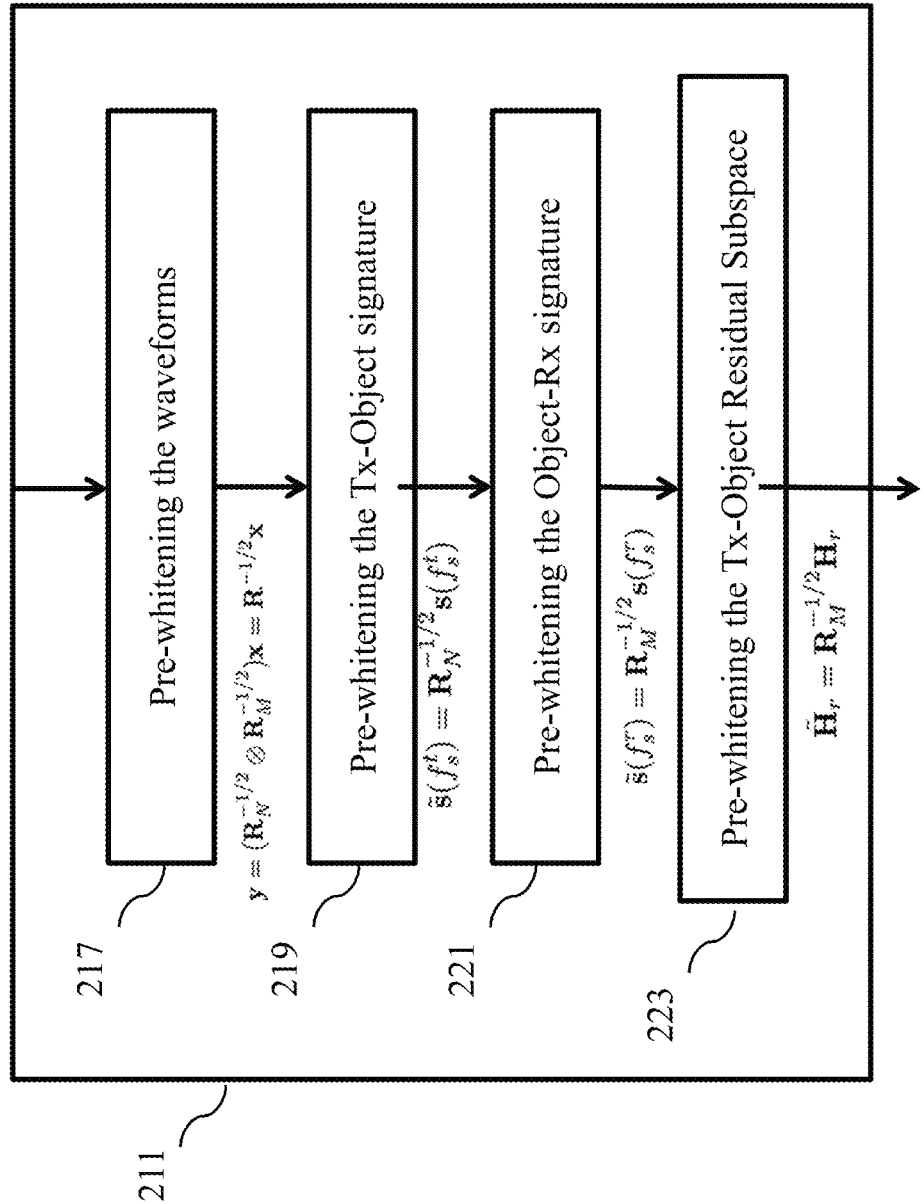
FIG. 2C illustrates steps to perform the pre-whitening of the separated waveforms and signatures, in accordance with an example embodiment.

FIG. 2C illustrates steps to perform the pre-whitening of the separated waveforms and signatures, in accordance with an example embodiment. Details the pre-whitening using known/estimated covariance matrix implemented at step 211 in FIG. 2B is explained with reference to FIG. 2C. At step 217, pre-whitening all the separated waveforms using the covariance matrix R. The pre-whitening of the waveforms can be implemented using:

$$y = \left(R_N^{-1/2} \otimes R_M^{-\frac{1}{2}}\right)x = R^{-1/2}x \quad (37)$$

At step 219, pre-whitening the transmitter-object signature $s(f_s^t)$ using following equation:

$$\tilde{s}(f_s^t) = R_N^{-1/2} s(f_s^t) \quad (38)$$

At step 221, pre-whitening the object-receiver signature $s(f_s^r)$, $$\tilde{s}(f_s^r) = R_M^{-1/2} s(f_s^r) \quad (39)$$

And finally at step 223, pre-whitening the transmitter-object residual subspace $H_r$ using $$\tilde{H}_r = R_M^{-1/2} H_r \quad (40)$$

The pre-whitened separated waveforms and signatures are then used for computing GLRT statistic as explained earlier with respect to FIG. 2B.

Figure 2D:
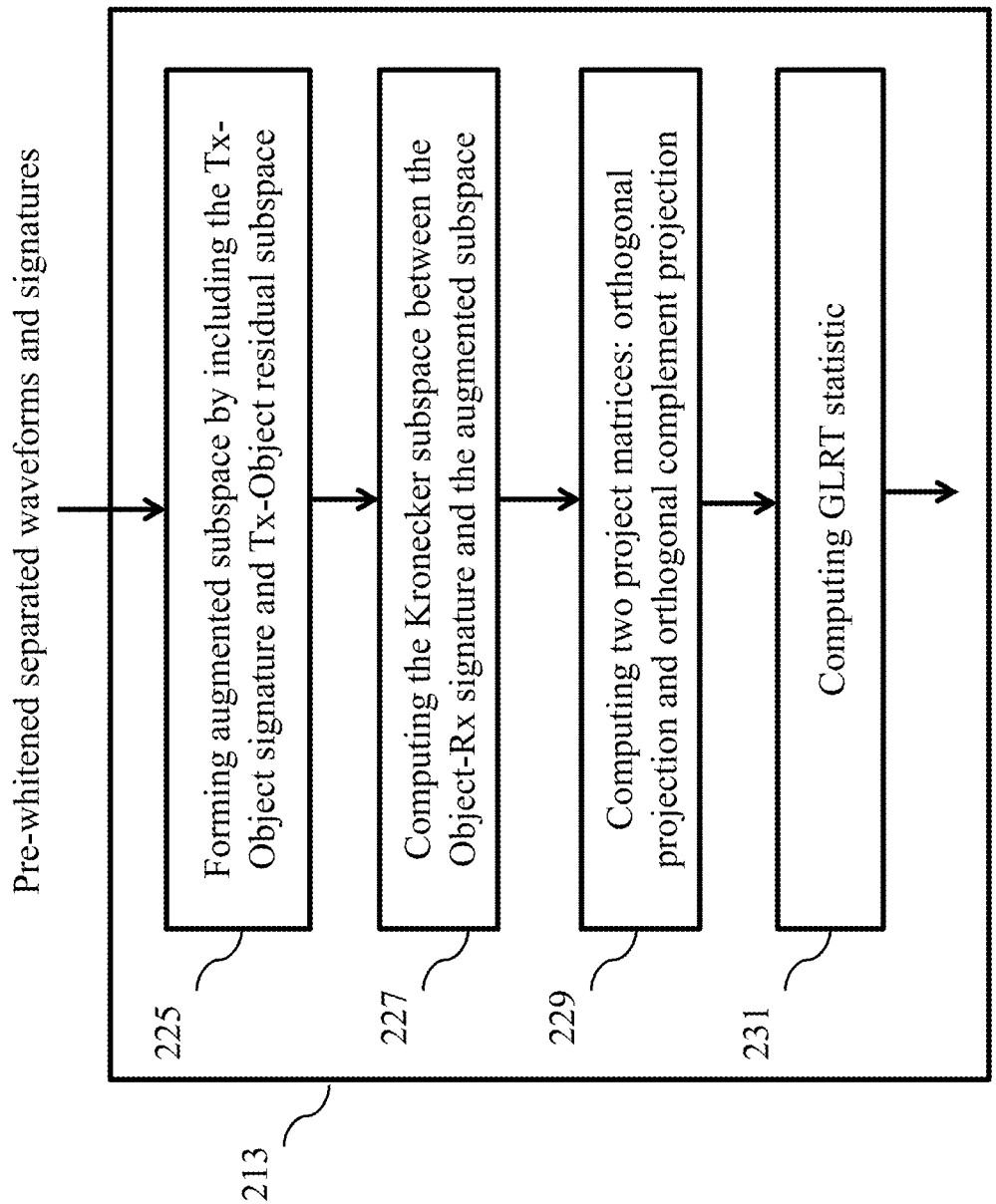
FIG. 2D illustrates steps to compute the GLRT statistic using the pre-whitened waveforms and signatures, according to an example embodiment.

FIG. 2D illustrates steps to compute the GLRT statistic using the pre-whitened waveforms and signatures, according to an example embodiment. Details of computing GLRT statistic at the step 213 illustrated in FIG. 2B is explained with reference to FIG. 2D. At step 225, forming an augmented subspace by including the transmitter-object signature and the transmitter-object residual subspace. The augmented subspace is given as:

$$\tilde{H}_t(f_s^t) = [\tilde{s}(f_s^t), \tilde{H}_r(f_s^t)] \quad (41)$$

At step 227, computing the Kronecker subspace between the object-receiver signature and the augmented space:

$$\tilde{s}(f_s^r) \otimes \tilde{H}_t(f_s^t) \quad (42)$$

At step 229, computing two project matrices: orthogonal projection and orthogonal complement projection, which are given as follows:

$$P_{\tilde{s}\otimes\tilde{H}_t} = (\tilde{s}\otimes\tilde{H}_t)[(\tilde{s}\otimes\tilde{H}_t)^H(\tilde{s}\otimes\tilde{H}_t)]^{-1}(\tilde{s}\otimes\tilde{H}_t)^H$$

$$P_{\tilde{s}\otimes\tilde{H}_t}^\perp = I - P_{\tilde{s}\otimes\tilde{H}_t} \quad (43)$$

At step 231, computing GLRT statistic, to that end, let the $T_{num} = Y^H P_{\tilde{s}\otimes\tilde{H}_t} y$ and $T_{den} = y^H P_{\tilde{s}\otimes\tilde{H}_t}^\perp y$.

Further, in order to compare the GLRT statistic with a threshold. To select a proper threshold to meet a given probability of false alarm, we have the following lemma.

Lemma: Under the first hypothesis $H_0$, the numerator and denominator have the following distributions $$\frac{2}{\sigma^2} T_{num} = \frac{2}{\sigma^2} \sum_{n=1}^{d} |\tilde{w}_n|^2 \sim \chi_{2d}^2 \quad (44)$$

$$\frac{2}{\sigma^2} T_{den} = \frac{2}{\sigma^2} \sum_{n=d+1}^{MN} |\tilde{w}_n|^2 \sim \chi_{2(MN-d)}^2 \quad (45)$$

where $\tilde{w}_n$ is the n-th element of the whitened noise $\tilde{w}_n$. Further, the projection matrix $P_A$ can be decomposed as $P_A = Q\text{diag}\{1, \ldots, 1, 0, \ldots, 0\}Q^H$ with Q containing corresponding eigenvectors and d non-zeros eigenvalues. Then the GLRT statistic is a ratio of two independent central Chi-square distributions with 2d and 2(MN–d) degrees of freedom, respectively. As a result, a first distribution under the first hypothesis is obtained as follows:

$$\frac{(MN-d)}{d} T' \sim F_{2d, 2(MN-d)}, \text{ under } H_0 \quad (46)$$

where $F_{v1,v2}$ is a central F-distribution with degrees of freedom v1 and v2.

Given the above lemma and (46), one can select a proper threshold in advance.

Figure 2E:
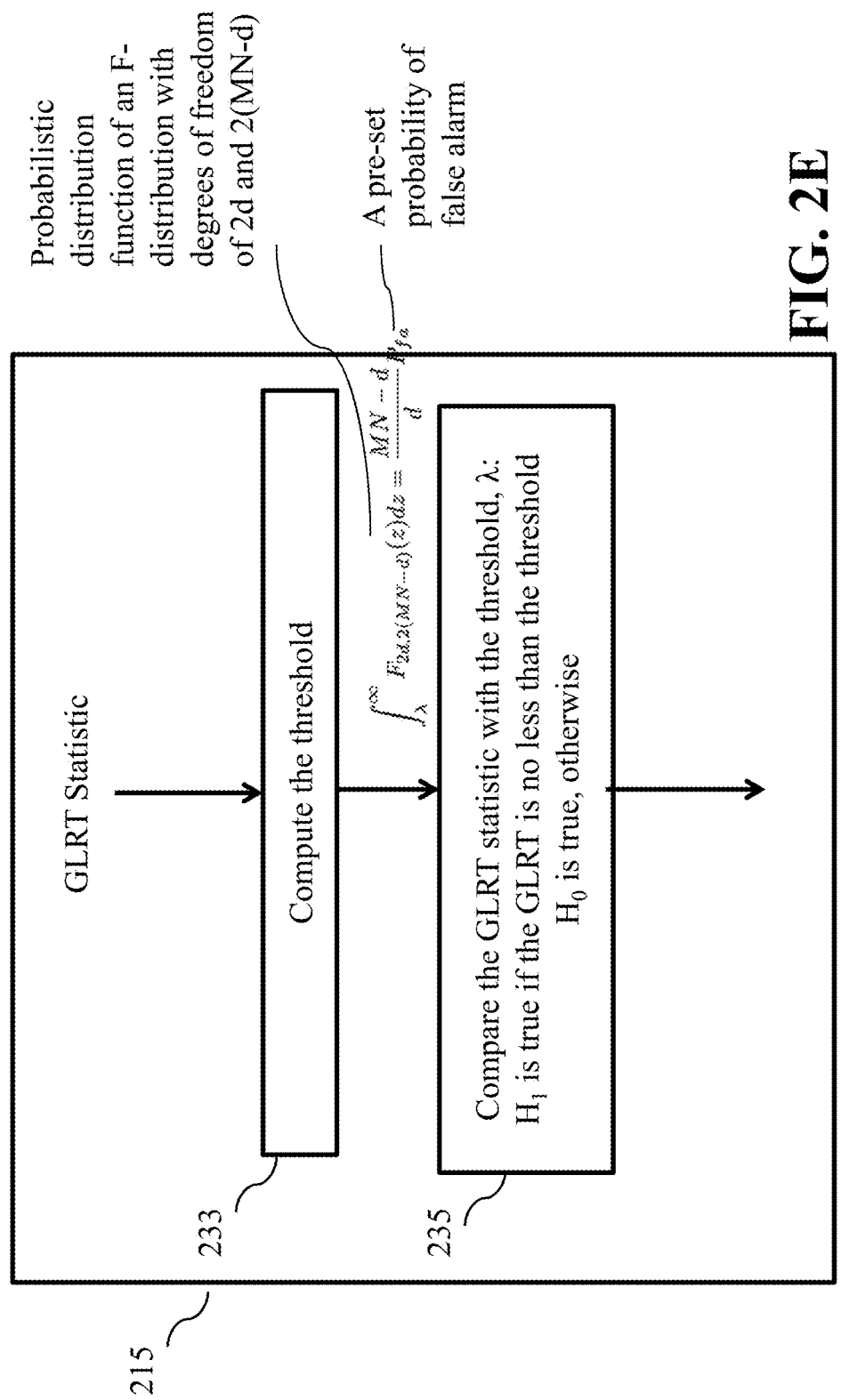
FIG. 2E illustrates steps of threshold comparison by computing the test threshold and comparing it with the GLRT statistic, in accordance with an example embodiment.

FIG. 2E illustrates steps of threshold comparison by computing the test threshold and comparing it with the GLRT statistic, in accordance with an example embodiment. Details of threshold comparison at the step 215 illustrated in FIG. 2B is explained with reference to FIG. 2E. At step 233, given the number of transmit elements and receive elements (M, N) and subspace dimension, a threshold λ is selected to meet the probability of false alarm $$\int_\lambda^\infty F_{2d,2(MN-d)}(z)dz = \frac{(MN-d)}{d}P_{fa} \quad (50)$$

where $F_{2d,2(MN-d)}(z)$ is a probabilistic distribution function of an F-distribution with degrees of freedom of 2d and 2(MN−d), and $P_{fa}$ is a given probability of false alarm.

At step 235, comparing the GLRT statistic with the threshold λ, where the hypothesis $H_1$ is true when the GLRT statistic is no less than the threshold, and the hypothesis $H_0$ is true, otherwise. Thus, Lemma 1 implies that the GLRT is a constant false alarm rate (CFAR) detector. Thus, when the GLRT algorithm determines that the hypothesis $H_1$ is true, then the spatial MIMO detector 107 has detected the moving object at a particular spatial location. On the other hand, when the GLRT algorithm determines that the hypothesis $H_0$ is true, then the spatial MIMO detector 107 has detected no object.

Performance Validation

Further, the performance of the Kronecker-subspace based object detector is evaluated to verify the analysis provided above. To that end, a signal-to-interference-plus-noise ratio (SINR) and residual-to-interference ratio (RINR) as respectively, $$SINR = \frac{2|\alpha|^2(s^H R^{-1} s)(t^H R^{-1} t)}{\sigma^2} \quad (51)$$

$$RINR = \frac{2(s^H R^{-1} s)(\eta^H H^H R^{-1} H\eta)}{\sigma^2} \quad (52)$$

where s represents the steering vector corresponding to N=16 receivers, t is the steering vector for M=8 transmitters, and the disturbance covariance matrix R is given as $[R]_{lk}=\rho^{|l-k|}$ with ρ=0.6. The detection performance is evaluated in terms of the receiver operating characteristic (ROC) by using Monte-Carlo trials. Further, for performance comparison, conventional MIMO detector which ignores the presence of waveform residuals are also considered.

Figure 3A:
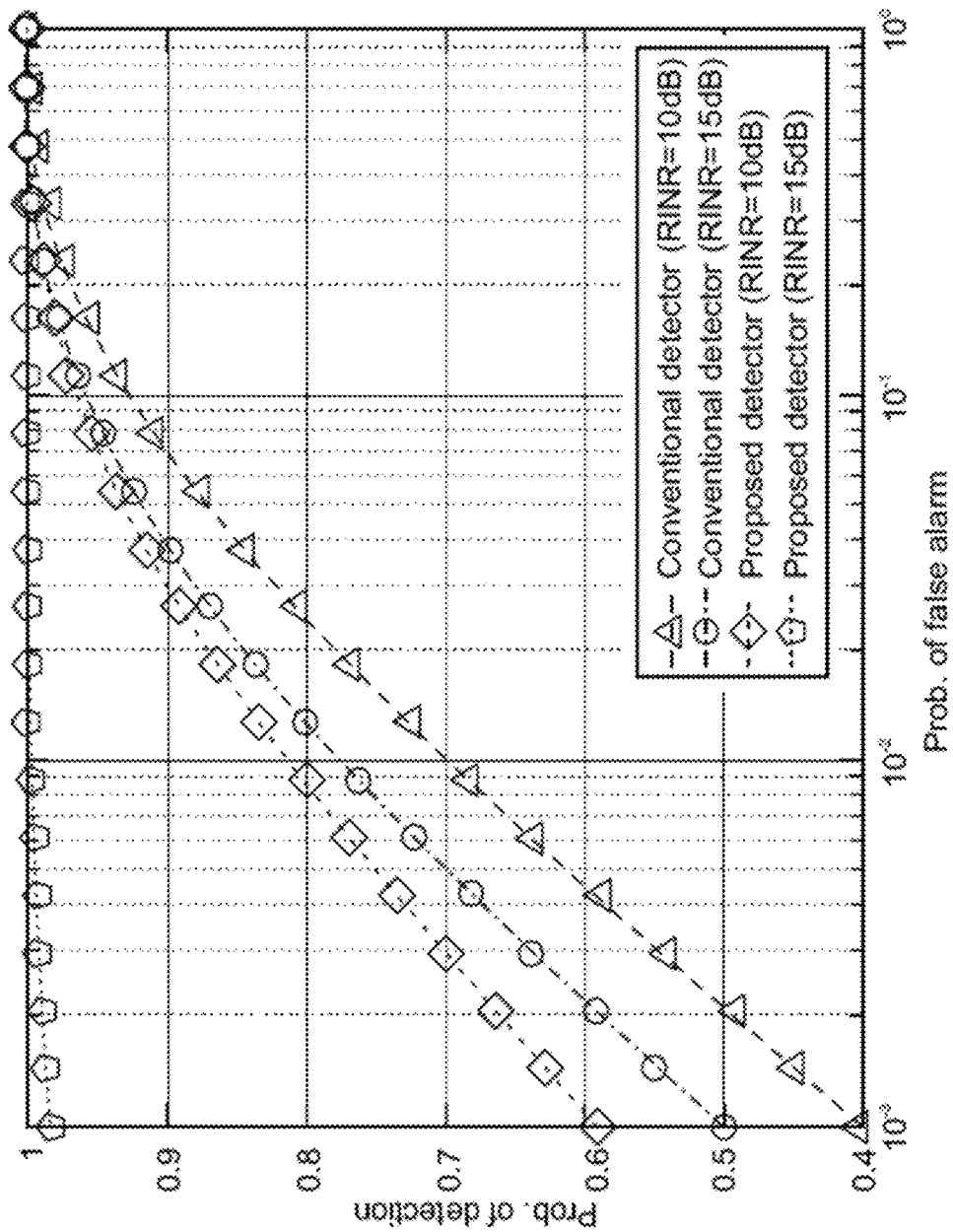
FIG. 3A shows the receiver operating characteristic (ROC) curve under two levels of waveform separation residuals when SINR=10 dB.
Figure 3B:
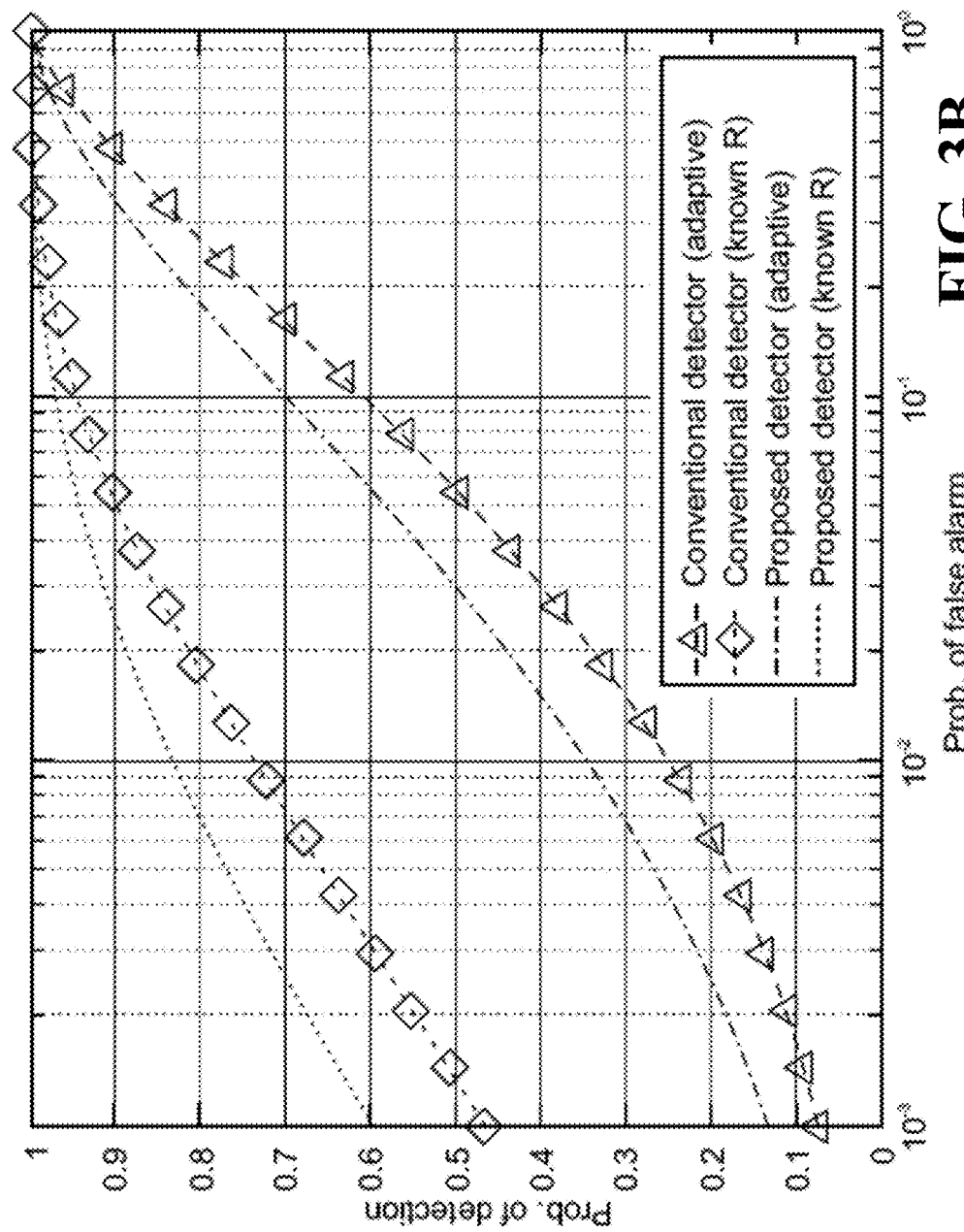
FIG. 3B shows performance comparison of two object detectors in scenarios of clairvoyant (known R) and adaptive (unknown R) detection.
Figure 3C:
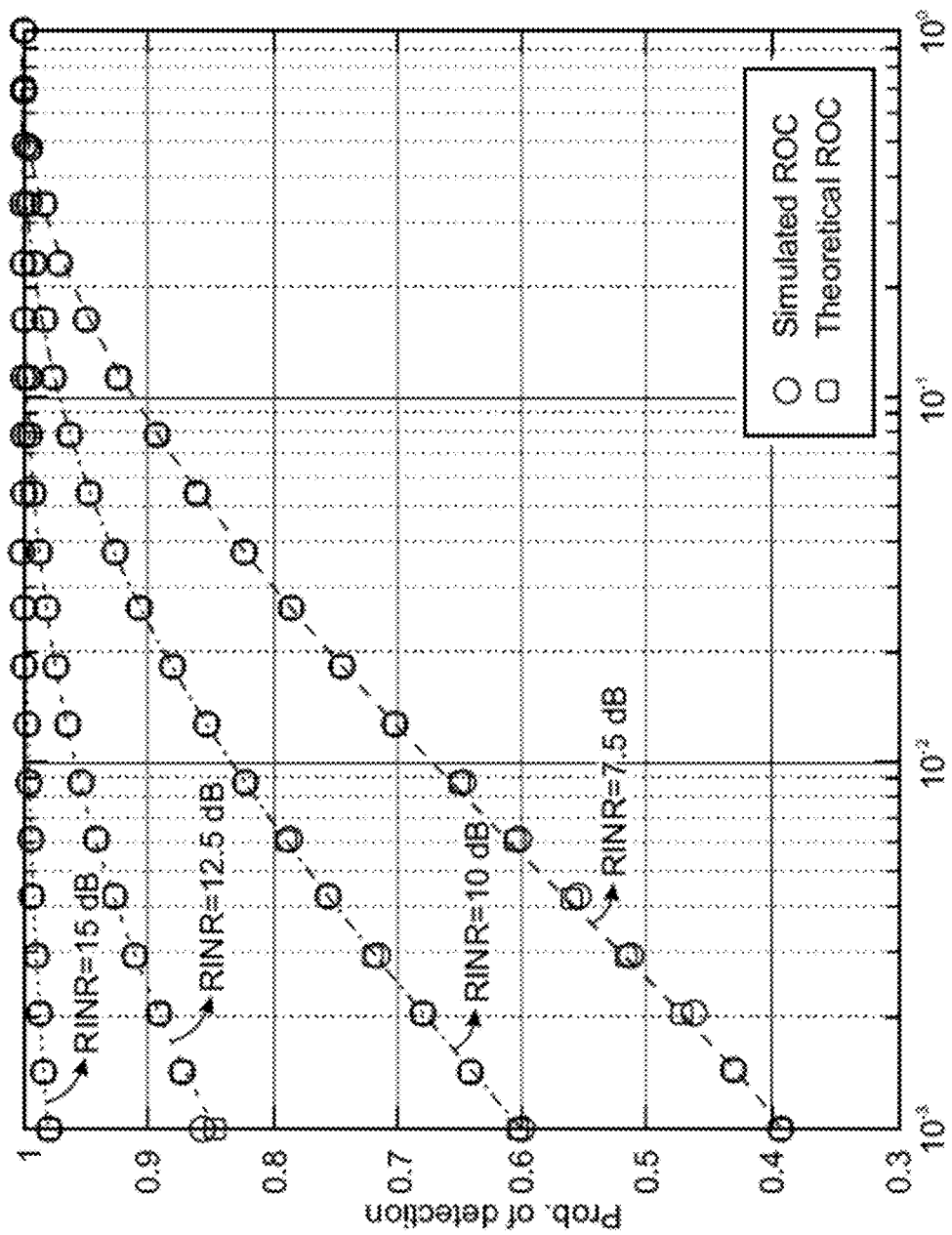
FIG. 3C shows performance validation of theoretical (squares with dashed lines) ROC curves with Monte-Carlo simulated results (circles) at various RINRs when SINR=10 dB.

Detection Performance Evaluation:

Detection performance evaluation of the proposed radar system 100 using the explicit signal model is explained below with reference to FIGS. 3A-FIG. 3C. FIG. 3A shows the receiver operating characteristic (ROC) curve under two levels of waveform separation residuals when SINR=10 dB. FIG. 3B shows performance comparison of two object detectors in scenarios of clairvoyant (known R) and adaptive (unknown R) detection. Further, FIG. 3C shows performance validation of theoretical (squares with dashed lines) ROC curves with Monte-Carlo simulated results (circles) at various RINRs when SINR=10 dB.

Case 1: When disturbance represented by the covariance matrix R is known or R=I, received signal x and steering vectors t and s are pre-whitened first using $R^{-1/2}$. When SINR=10 dB, FIG. 3A shows the ROC performance of the conventional detector and the proposed detector under two levels of waveform residuals: 1) RINR=10 dB and 2) RINR=15 dB. As can be observed from the graph shown in FIG. 3A by exploiting the target residual, the detection performance can be improved. Besides, larger performance improvement can be achieved if the target residual component is stronger (i.e., with larger RINR). This observation is intuitive as the stronger the target residual, the larger the separation between the null and alternative hypotheses and, hence, the better detection performance.

Case 2: When the disturbance matrix R is unknown. In this case, training signals x(l) from nearby range bins l are used for adaptive object detection. FIG. 3B shows, when RINR=10 dB and 2) RINR=10 dB, the ROC curves for both adaptive and clairvoyant (known R) schemes of both detectors. It can be observed that the detection performance degrades for both detectors when the disturbance covariance matrix has to be estimated from training signals. Further, in the case of adaptive detection, the proposed detector still outperforms the conventional detector.

Further, the theoretical performance of the proposed Kronecker subspace-based object detector is validated using Monte-Carlo simulation results. To that end, the inverse of the cumulative distribution function (CDF) of an F-distribution and the CDF of a non-central F-distribution are evaluated. FIG. 3C shows the simulated ROC curves under various RINRs ranging from 7:5 dB to 15 dB and corresponding theoretical performances. It can be observed from FIG. 3C that for all considered scenarios, the theoretical performance agrees well with simulated ROC curves even at small probabilities of false alarm, e.g., $P_f=0.001$.

Figure 4:
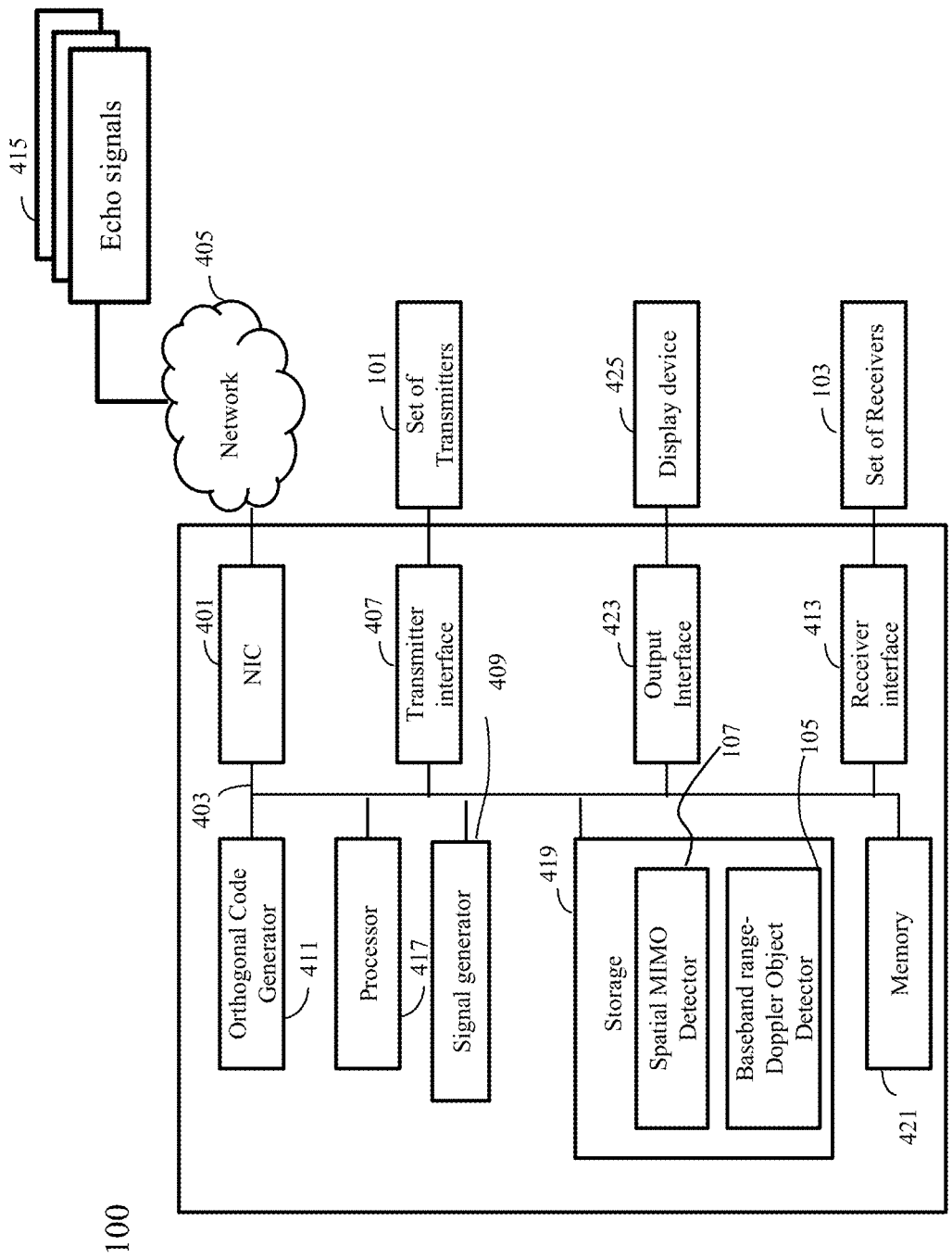
FIG. 4 illustrates a block diagram of the MIMO radar system 100, in accordance with some embodiments.

Exemplar Implementation:

FIG. 4 illustrates a block diagram of the MIMO radar system 100, in accordance with some embodiments. The MIMO radar system 100 can have a number of interfaces connecting the system 100 with other systems and devices. A network interface controller 401 is adapted to connect the system 100 through bus 403 to a network 405 connecting the MIMO radar system 100 with sensing devices. For example, the radar system 100 includes a transmitter interface 407 configured to command to the set of transmitters 101 to emit coded FMCW pulses. The transmitter interface 407 is in communication with a signal generator 409 that generates FMCW pulses. Further, an orthogonal code generator 411 is used to generate different orthogonal codes which are multiplied with FMCW pulses associated with each transmitter of the set of transmitters 101. Using a receiver interface 413 connected to the set of receivers 103, the system 100 can receive reflections i.e. echo signals 415 from the one or more objects corresponding to the transmitted pulses. The received reflection comprises superposition of reflections corresponding to all the transmitted pulses that reflected from the one or more objects. The echo signals are received from the one or more objects through the network 405.

Further, the system 100 includes a processor 417 configured to execute stored instructions 419, as well as a memory 421 that stores instructions that are executable by the processor 417. The processor 417 can be a single core processor, a multi-core processor, a computing cluster, or any number of other configurations. The memory 421 can include random access memory (RAM), read only memory (ROM), flash memory, or any other suitable memory systems. The processor 417 can be connected through the bus 503 to one or more input and/or output (I/O) devices.

The instructions can implement a method that takes into consideration imperfect waveform separations for detecting the one or more moving object. To that end, the instructions include the baseband range-Doppler object detector 105 that obtains the echo signals 415 and detects one or more objects in the Doppler domain. Further, the baseband range-Doppler object detector 105 estimates range of the one or more objects and velocities of the one or more objects. The instructions further include the spatial MIMO detector 107 that determines presence of the object at a given combination of the transmitter-object angle and object-transmitter angle.

The MIMO radar system 100 includes an output interface 423 configured to output parameters associated with the detected object. The parameters may comprise at least one of radial velocity, a spatial angle, and a distance to the detected object. The output interface 423 may output the parameters on a display device 425, store the parameters into a storage medium and/or transmit the parameters over the network 405. For example, the system 100 can be linked through the bus 403 to a display interface adapted to connect the system 100 to the display device 425, such as a computer monitor, camera, television, projector, or mobile device, among others. The system 100 can also be connected to an application interface adapted to connect the system 100 to equipment for performing various tasks.

In an example embodiment, an automobile may comprise the proposed MIMO radar system 100. The automobile may be an autonomous driving vehicle. While the automobile is riding on a highway, the radar system 100 keeps detecting for the one or more moving objects (such as vehicles, pedestrians, or the likes). To that end, the system 100 transmits pulses in all directions and further obtains corresponding echo signal. The echo signal comprises superposition of reflections corresponding to all the transmitted pulses that are reflected from the one or more moving objects. The system 100 at first detects the one or more objects in Doppler domain, estimates ranges and velocities corresponding to the one or more objects. Further, the radar system 100 performs waveform separation based on the proposed explicit signaling model.

The radar system 100, further determines other parameters associated with the detected one or more objects such as radial velocities of the one or more objects, distance of the one or more objects, and the likes. The radar system 100 keeps a driver of the automobile updated about the detected one or more moving objects. Based on the obtained information, the driver may for example steer the automobile, adjust speed of the automobile, and the likes. In an example embodiment, the radar system 100 determines whether the one or more moving objects are moving towards the automobile or away from the automobile. This enables the driver to better control the automobile.

In various implementations, the MIMO radar system for detecting a moving object includes a set of transmitters and a set of receivers forming a virtual array of unique pairwise combinations of the transmitters and the receivers to measure reflections of transmissions. For example, in one embodiment, the MIMO radar system is installed at a moving vehicle and operatively connected to a control system for controlling motion of the vehicle. In one implementation, the control system is arranged on the controlled vehicle, such as an autonomous or semi-autonomous vehicle. In another implementation, the control system is arranged on a road side unit (RSU) and commutatively connected to the controlled vehicle. Additionally or alternatively, the MIMO radar system can be installed on RSU to measure parameters of object moving in an area controlled by the RSU.

To that end, in various embodiments, the set of transmitters and receivers are arranged on the controlled vehicle, on the RSU or combination thereof. The transmitters and receivers can be collocated to form a set of transceivers or specially separated. In some embodiments, the MIMO radar system includes multiple transmitters and multiple receivers. In some implementations, the transmitters and/or receiver are equidistant, i.e., the distance between any pair of transmitters or receivers is a constant. In such a manner, the computation of transmitters and/or receivers signatures can be simplified.

Multiple transmitters and receivers of some embodiments are added to improve spatial resolution. The MIMO radar systems transmit mutually orthogonal signals from multiple transmitters, and these waveforms can be extracted from each of the receivers by a set of matched filters. For example, if a MIMO radar system has three transmitters and four receivers, 12 signals can be extracted from the receiver because of the orthogonality of the transmitted signals. That is, a 12-element virtual antenna array is created using only 7 antennas by conducting digital signal processing on the received signals, thereby obtaining a finer spatial resolution compared with its phased array counterpart.

The MIMO radar system of some embodiments is configured to detect a moving object, such as another vehicle or a pedestrian, and determine various parameters of the moving objects. Examples of parameters include one or combination of a range of the moving object, e.g., a distance from the radar to the moving object, a velocity of the moving object, e.g., an absolute or relative velocity between the radar and the moving object, an angle of the moving object defining a direction from the radar to the moving object, and an elevation of the moving object, e.g., defining an absolute or relative altitude between the altitudes of the radar to the moving object. For estimation of parameters of the moving object, both absolute or relative, the MIMO radar system is connected to various measurements units associated with control vehicle, RSU, or any other system where the MIMO radar system is arranged. For example, the MIMO radar system can be connected to speedometer and accelerometer of the control vehicle to estimate the velocity of the control vehicle. The MIMO radar system can be also connected to a position estimator, e.g., GPS, of the controlled vehicle to receive position information of the vehicle.

Due to multiple transmissions design to increase the spatial resolution of the MIMO radar system, various embodiments use coded transmission encoded with orthogonal codes to avoid interference. However, due to motion of the detected objects and imperfection of simplification of computation requirements, the waveform separation of some transmissions used by some embodiments include residuals from other transmissions that can degrade the quality of parameter estimation.

To that end, in some embodiments, the MIMO radar system includes a memory configured to store an explicit signal model that accounts for waveform separation residuals by relating measurements of the virtual array to an auto-term including a Kronecker product of the object-receiver signature of the receiver array and the transmitter-object signature of the transmitter array, and a cross-term including a Kronecker product of the object-receiver signature of the receiver array and the transmitter-object residual signature of the transmitter array, and a processor configured to detect a moving object by executing a spatial MIMO detector configured to detect the moving object using the explicit signal model. An output interface of the MIMO radar system is configured to output parameters associated with the detected object.

There are a number of different reasons can lead into a leakage of waveform separation manifested by residuals. For example, in one embodiment, the MIMO radar system has slow-time MIMO FMCW automotive radar system architecture. According to this architecture, the transmitted signals include a sequence of pulses, and each pulse is frequency modulated to simplify range estimation. For example, due to this modulation, the distance to detected object can be determined by beating a reflected signal with a reference signal and detecting a peak of beat signal. The frequency of the peak corresponds to the distance to the object. To that end, in some embodiment, the reflected signals are fast-sampled at each receiver, i.e., sampled multiple times per pulse, to perform such a computation.

To determine the velocity of the moving object, some embodiments use the Doppler effect, such that the velocity of the object corresponds to a Doppler shift in the received signal caused by the relative motion of the moving object. To estimate such a Doppler shift, the received signals are slow sampled on a pulse-by-pulse basis. Hence, the number of samples corresponds to a number of pulses. To increase the resolution of the estimated velocity there is a need to increase the number of samples. However, the increase of the number of pulses increases the illumination time needed for detecting the object, which is undesirable in a dynamically changing vehicular scenario. Hence, there can be mismatch between the actual and estimated velocities corresponding to an error of the estimation. Such an error, referred here as Doppler mismatch, causes the residuals of waveform separation.

For example, in one embodiment, the processor of the MIMO radar system is configured to execute a baseband range-Doppler object detector configured to detect one or more moving objects, estimate a range and a velocity of each of the detected moving objects, and, for each detected moving object, extract a portion of the measurements of the virtual array corresponding to the range of the moving object, compensate the extracted measurements for the velocity of the moving object, and submit the extracted and compensated measurements to the spatial MIMO detector to determine one or combination of an angle and an azimuth of the moving object.

The separation of the range, velocity and angle estimation simplifies the computation. For example, the range and velocity can be estimated in the range-Doppler domain without waveform separation. Hence, a reflection received by any receiver can be used to estimate the range and the velocity. Additionally or alternatively, combination of the received echoes can be used to improve the SNR of the received signal. In other words, the range and velocity can be determined using individual reflection. However, the angle and/or azimuth of the moving object are determined collectively using all reflection and after waveform separation. Such a collective estimation forms a Kronecker structure of the explicit signal model described above.

In addition, the separation of the range and velocity estimation from angle estimation allows to determine angles of multiple moving object in a scene separately. This is achieved by detecting the moving object first by the baseband range-Doppler object detector and iterative execution of the spatial MIMO detector for the portion of the measurements corresponding to a particular moving object. To achieve better angle estimation, the velocity and range of the detected object are compensated to move all detected object in a point of origin of the spatial MIMO estimator regardless of the actual velocity of the moving object. This simplifies the computation, but because of the Doppler mismatch introduces the residual in waveform separation.

For example, in one embodiment, each transmitter is configured to transmit a set of frequency modulated pulses to illuminate a scene and to form the measurements, wherein the baseband range-Doppler object detector is configured to determine the range of the moving object using a fast-time fast Fourier transform (FFT) that samples each transmitted pulse multiple times for range compression, and wherein the baseband range-Doppler object detector is configured to determine the velocity of the moving object using a slow-time FFT that samples each transmitted pulse once for Doppler compression.

Here, the size of the set of frequency modulated pulses defines a resolution of velocity estimation causing a Doppler mismatch between an actual velocity of the moving object and the velocity estimated by the baseband detector using the slow-time FFT, and wherein the frequency modulated pulses of different transmitters are encoded on pulse-by-pulse basis with orthogonal codes and decoded with corresponding orthogonal codes for each transmitter-receiver pair of the virtual array, wherein the auto-term of the explicit signal model captures decoded transmission of the transmitter-receiver pair, and wherein the cross-term of the explicit signal model captures residuals of different transmissions in the decoded transmission of the transmitter-receiver pair caused by the Doppler mismatch.

Some embodiments use the following terminology that reads on (function of) the following:

the transmitter-object signature of a transmitter:
i. $e^{-2\pi(m-1)f_s^t}$;

the object-receiver signature of a receiver:
ii. $e^{-2\pi(n-1)f_s^r}$;

the transmitter-object signature of the transmitters, i.e., transmitter array $$s(f_s^t) = \begin{bmatrix} 1 \\ e^{-2\pi f_s^t} \\ \vdots \\ e^{-2\pi(M-1)f_s^t} \end{bmatrix};$$

the object-receiver signature of the receivers, i.e., receiver array:

b. $$s(f_s^r) = \begin{bmatrix} 1 \\ e^{-2\pi f_s^r} \\ \vdots \\ e^{-2\pi(N-1)f_s^r} \end{bmatrix};$$

the transmitter-object residual signature of a transmitter:

$(\Sigma_{m \neq i} e^{-j2\pi f_s^t(m-1)} \eta_{im})$ for the $i$-th transmitter;

Within the summation, each term is a product of the regular transmitter-object signature of a transmitter (see 1.) and a weight. The weight can be computed as $\eta_{im} = \Sigma_k c_m(k) c_i(k) e^{-j2\pi \Delta f_d k}$;

As a function of codes, the unknown Doppler mismatch and the number of pulses.

the transmitter-object residual signature of the transmitter array $$s_r(f_s^t, \Delta f_d) = \begin{bmatrix} \left(\sum_{m \neq 1} e^{-j2\pi f_s^t(m-1)} \eta_{1m}\right) \\ \left(\sum_{m \neq 2} e^{-j2\pi f_s^t(m-1)} \eta_{2m}\right) \\ \vdots \\ \left(\sum_{m \neq M} e^{-j2\pi f_s^t(m-1)} \eta_{Mm}\right) \end{bmatrix};$$

Object signature of the virtual array (MN pairs of transmitters-receivers):

$$s(f_s^r) \otimes s(f_s^t);$$

A Kronecker product of items 3 and 4 above.

Residual signature of the virtual array (MN pairs of transmitters-receivers):

$$s(f_s^r) \otimes s_r(f_s^t, \Delta f_d);$$

A Kronecker product of items 6 and 4 above.

In such a manner, for each transmitter-receiver pair of the virtual array, the transmitter-object residual signature of the transmitter of the transmitter-receiver pair is a weighted sum of transmitter-object signatures of all transmitters with an exception of the transmitter of the transmitter-receiver pair, where the weights are a function of the Doppler mismatch between the actual velocity of the moving object and the velocity estimated by the baseband detector.

Some embodiments are based on understanding that the major cause of Doppler mismatch is quantization of velocity estimation caused by a limited number of pulses. The actual Doppler mismatch is unknown and is determined online by evaluating the extended signal model. However, the quantization of the velocity estimation can define the maximum Doppler mismatch for each Doppler frequency, while the code, the number of pulses, the arrangement of the receivers and transmitters can define a weight of each maximum Doppler mismatch in angle estimation. Such a weight of each maximum Doppler mismatch can be evaluated in advance. To that end, some embodiments set the weights to compute a transmitter-object residual signature of a particular transmitter to zero, when these weights corresponding to transmitter-object signatures of a number of other transmitters determined using a maximum Doppler mismatch is less than a threshold. In FIG. 1J, the weights used to compute a transmitter-object residual signature of a particular transmitter are shown in equation (19), where the transmitter-object residual signature of a particular (i.e., the i-th) transmitter is shown in equation (18).

In such a manner, the transmitter-object residual signature of a transmitter is a weighted sum of transmitter-object (regular, i.e., not residual) signatures of all other transmitters, where the weights are a function of the codes, (unknown) Doppler mismatch, and the number of pulses.

Additionally or alternatively, knowledge of maximum Doppler mismatch can simplify evaluation of the explicit signal model. For example, in one embodiment, the transmitter-object residual signature of a particular transmitter is approximated as a weighted sum of transmitter-object signatures of a limited number of transmitters, instead of all other transmitters. The selection of these transmitters can be determined by using a predetermined maximum Doppler mismatch.

In various embodiments, the transmitter-object signature of transmitters is a function of a relative angle between each transmitter of the set of transmitters and the detected object, wavelength of transmitted signal, and a relative distance between the two consecutive transmitter elements of the set of transmitters. In addition, the object-receiver signature of receivers is a function of a relative angle between each receiver of the set of receivers and the detected object, wavelength of received signal, and a relative distance between the two consecutive receiver elements of the set of receivers. The notions of signatures are explain with relation to FIGS. 1F and 1G. The signatures of a transmitter/receiver and the transmitter/receiver array allow to evaluate multiple reflections collectively as part of Kronecker structure.

In alternative embodiment, the MIMO radar system uses a single detector configured to estimate various parameters of the moving object, such as at least one of radial velocity, a spatial angle, and a distance to the detected object. This embodiment forms a multidimensional Kronecker structure of the parameters of the moving object. However, the cross-terms defining residuals of waveform separation has non-zero values only for a subset of dimensions, e.g., corresponding to an angle of the moving object.

In some embodiments, the spatial MIMO detector is implemented using a generalized likelihood ratio test (GLRT) algorithm, wherein the GLRT algorithm determines a GLRT statistic to detect the moving objects. This embodiment allows to increase accuracy of estimation be taking the noise and waveform separation residuals of the measurements into the account.

For example, the GLRT algorithm formulates and tests a first hypothesis and a second hypothesis, wherein the first hypothesis is that the reflections of transmission comprises only noise, and the second hypothesis is that the reflections of transmission comprises reflected signals from the moving objects, the waveform separation residuals, along with the noise.

For example, in some embodiments, the GLRT determines a first distribution under the first hypothesis, and a second distribution under the second hypothesis, wherein the first distribution is a central F distribution, and wherein the second distribution is a non-central F distribution. In one embodiment, the processor is further configured to: compare the GLRT statistic with a predetermined threshold, wherein the predetermined threshold is based on the number of transmitters and receivers, and the subspace dimension, wherein when the GLRT statistic is greater than the predetermined threshold, the second hypothesis is true, and wherein when the GLRT statistic is less than the predetermined threshold, the first hypothesis is true.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A multiple input multiple output (MIMO) radar system for detecting a moving object, the system comprising:
    a set of transmitters and a set of receivers forming a virtual array of unique pairwise combinations of transmitters and receivers to measure reflections of transmissions;
    a memory configured to store an explicit signal model that accounts for waveform separation residuals, wherein the explicit signal model for a specific pair of a transmitter and a receiver of the virtual array comprises-an auto-correlation term including a Kronecker product of an object-receiver signature for the receiver of the specific pair and a transmitter-object signature for the transmitter of the specific pair, and a cross-correlation term including a Kronecker product of the object-receiver signature and transmitter-object residual signatures of the set of transmitters other than the transmitter of the specific pair,
        wherein the transmitter-object signature is a function of a relative angle between the transmitter of the specific pair and the moving object, wavelength of a transmitted signal, and a relative distance between two consecutive transmitters of the set of transmitters,
        wherein the object-receiver signature is a function of a relative angle between the receiver of the specific pair and the moving object, wavelength of a received signal, and a relative distance between the two consecutive receivers of the set of receivers,
        wherein the transmitter-object residual signatures are approximated as a weighted sum of transmitter-object signatures of a limited number of transmitters of the set of transmitters, and
        wherein the limited number of transmitters are identified based on a predetermined maximum Doppler mismatch for the moving object;
    a processor configured to detect the moving object by executing a spatial MIMO detector configured to detect the moving object using the explicit signal model; and
    an output interface configured to output parameters associated with the detected moving object.

2. The MIMO radar system of claim 1, wherein the processor is configured to execute a baseband range-Doppler object detector configured to detect one or more moving objects, estimate a range and a velocity of each of the detected one or more moving objects, and, for the detected moving object of the one or more moving objects, extract measurements of the virtual array corresponding to the range of the moving object, compensate the extracted measurements for the velocity of the moving object, and submit the extracted and compensated measurements to the spatial MIMO detector to determine one or combination of an angle and an azimuth of the moving object.

3. The MIMO radar system of claim 2, wherein each transmitter is configured to transmit a set of frequency modulated pulses to illuminate a scene comprising the moving object and to form the measurements, wherein the baseband range-Doppler object detector is configured to determine the range of the moving object using a fast-time fast Fourier transform (FFT) that samples each transmitted pulse multiple times for range compression, and wherein the baseband range-Doppler object detector is configured to determine the velocity of the moving object using slow-time FFT that samples each transmitted pulse once for Doppler compression.

4. The MIMO radar system of claim 3, wherein the size of the set of frequency modulated pulses defines a resolution of velocity estimation causing a Doppler mismatch between an actual velocity of the moving object and the velocity estimated by the baseband range-Doppler object detector using the slow-time FFT, and wherein the frequency modulated pulses of different transmitters are encoded on pulse-by-pulse basis with orthogonal codes and decoded with corresponding orthogonal codes for each transmitter-receiver pair of the virtual array, wherein the auto-correlation term of the explicit signal model captures decoded transmission of the transmitter-receiver pair, and wherein the cross-correlation term of the explicit signal model captures residuals of different transmissions in the decoded transmission of the transmitter-receiver pair caused by the Doppler mismatch.

5. The MIMO radar system of claim 2, wherein a transmitter-object residual signature for a particular transmitter is a function of a Doppler mismatch between an actual velocity of the moving object and the velocity estimated by the baseband range-Doppler object detector, and wherein the transmitter-object residual signature for the particular transmitter is set to zero when a maximum value of the transmitter-object residual signature for the particular transmitter determined for a maximum Doppler mismatch is less than a threshold.

6. The MIMO radar system of claim 1, wherein the parameters comprise at least one of radial velocity, a spatial angle, and a distance to the detected object.

7. The MIMO radar system of claim 1, wherein the processor uses a single detector configured to estimate parameters of the moving object including a radial velocity, a spatial angle, and a distance to the moving object, wherein the explicit signal model includes a multidimensional Kronecker structure of the parameters of the moving object, and wherein the cross-correlation term of the explicit signal model has zero values for dimensions corresponding to the radial velocity and the distance to the moving object, and wherein the cross-correlation term has non-zero values for a dimension corresponding to the spatial angle of the moving object.

8. The MIMO radar system of claim 1, wherein the spatial MIMO detector is implemented using a generalized likelihood ratio test (GLRT) algorithm, wherein the GLRT algorithm determines a GLRT statistic to detect the moving objects.

9. The MIMO radar system of claim 8, wherein the GLRT algorithm formulates and tests a first hypothesis and a second hypothesis, wherein the first hypothesis is that the reflections of transmission comprises only noise, and the second hypothesis is that the reflections of transmission comprises reflected signals from the moving objects, the waveform separation residuals, and the noise.

10. The MIMO radar system of claim 9, wherein the GLRT algorithm determines: a first distribution under the first hypothesis, and a second distribution under the second hypothesis, wherein the first distribution is a central F distribution, and wherein the second distribution is a non-central F distribution.

11. The MIMO radar system of claim 10, wherein the processor is further configured to:
    compare the GLRT statistic with a predetermined threshold,
    wherein when the GLRT statistic is greater than the predetermined threshold, the second hypothesis is true, and wherein when the GLRT statistic is less than the predetermined threshold, the first hypothesis is true.

13. A vehicle including a controller for controlling a motion of the vehicle, wherein the controller is operatively connected to the output interface of the MIMO radar system of claim 1, and configured to control the motion of the vehicle base on the parameters of the detected object.

13. A multiple input multiple output (MIMO) radar method for detecting a moving object, wherein the method uses a processor coupled to a memory storing an explicit signal model that accounts for waveform separation residuals, wherein the explicit signal model for a specific pair of a transmitter and a receiver of a virtual array of unique pairwise combinations of a set of transmitters and receivers comprises an auto-correlation term including a Kronecker product of an object-receiver signature for the receiver of the specific pair and a transmitter-object signature for the transmitter of the specific pair, and a cross-correlation term including a Kronecker product of the object-receiver signature and transmitter-object residual signatures of the set of transmitters other than the transmitter of the specific pair, wherein the transmitter-object signature is a function of a relative angle between the transmitter of the specific pair and the moving object, wavelength of a transmitted signal, and a relative distance between two consecutive transmitters of the set of transmitters, wherein the object-receiver signature is a function of a relative angle between the receiver of the specific pair and the moving object wavelength of a received signal and a relative distance between the two consecutive receivers of the set of receivers, wherein the transmitter-object residual signatures are approximated as a weighted sum of transmitter-object signatures of a limited number of transmitters of the set of transmitters, wherein the limited number of transmitters are identified based on a predetermined maximum Doppler mismatch for the moving object, and wherein the processor is coupled with stored instructions implementing the method, wherein the instructions, when executed by the processor carry out steps of the method, comprising:

receiving measurements of the set of transmitters and a set of receivers forming a virtual array of unique pairwise combinations of transmitters and receivers to measure reflections of transmissions;

detecting the moving object by executing a spatial MIMO detector configured to detect the moving object using the explicit signal model; and outputting parameters associated with the detected object.

* * * * *